United States Patent [19]

Baur et al.

[11] Patent Number: 5,576,867
[45] Date of Patent: Nov. 19, 1996

[54] LIQUID CRYSTAL SWITCHING ELEMENTS HAVING A PARALLEL ELECTRIC FIELD AND $\beta_O$ WHICH IS NOT 0° OR 90°

[75] Inventors: Günter Baur, Freiburg; Waltraud Fehrenbach, München; Barbara Weber nee Staudacher, Münchgrund; Friedrich Windscheid, Freiburg-Tiengen; Rudolf Kiefer, Vorstetten, all of Germany

[73] Assignee: Merck Patent Gesellschaft mit beschrankter Haftung, Darmstadt, Germany

[21] Appl. No.: 466,068

[22] Filed: Jun. 6, 1995

Related U.S. Application Data

[63] Continuation of Ser. No. 363,968, Dec. 23, 1994, abandoned, which is a continuation of Ser. No. 877,187, Aug. 6, 1992, abandoned.

[30] Foreign Application Priority Data

Jan. 9, 1990 [DE] Germany ............................ 40 00 451.1
Jan. 9, 1990 [WO] WIPO ....................... PCT/EP91/00022

[51] Int. Cl.⁶ ...................... G02F 1/1343; G02F 1/1337; G02F 1/141
[52] U.S. Cl. .................... 359/87; 359/89; 359/78
[58] Field of Search ................. 359/87, 89, 71, 359/73, 78

[56] References Cited

U.S. PATENT DOCUMENTS

| | | | |
|---|---|---|---|
| 3,674,342 | 7/1972 | Castellano et al. | 350/160 R |
| 3,736,047 | 5/1973 | Gelber et al. | 359/71 |
| 3,807,831 | 4/1974 | Soref | 350/150 |
| 3,834,794 | 9/1974 | Soref | 350/160 |
| 3,854,751 | 12/1974 | Haas et al. | 350/160 |
| 4,039,252 | 8/1977 | Mizuno et al. | 359/102 |
| 4,116,544 | 9/1978 | Soref | 350/336 |
| 4,345,249 | 8/1982 | Togashi | 340/784 |
| 4,844,569 | 7/1989 | Wada et al. | 359/53 |

FOREIGN PATENT DOCUMENTS

| | | | |
|---|---|---|---|
| 2328581 | 1/1974 | Germany. | |
| 2459533 | 7/1975 | Germany. | |
| 54-43048 | 4/1979 | Japan | 359/87 |
| 1506570 | 4/1978 | United Kingdom. | |
| 84/04601 | 11/1984 | WIPO. | |

OTHER PUBLICATIONS

Patent Abstracts of Japan, vol. 13, No. 242, P-880 (Jun. 7, 1989), 1-44422.
Patent Abstracts of Japan, vol. 13, No. 428, P-936 (Sep. 25, 1989), 1-161217.
Patent Abstracts of Japan, vol. 13, No. 460, P-946 (Oct. 18, 1989), 1-179912.
Patent Abstracts of Japan, vol. 13, No. 219, P-875 (May 23, 1989), 1-33521.
Patent Abstracts of Japan, vol. 3, No. 38, E-101 (Mar. 30, 1979) 54-17756.
Norris, "EID '95: International Giants and Local Flair", Information Display, vol. 12, No. 3, Mar. 1996, pp. 24–25 and 26.

(List continued on next page.)

*Primary Examiner*—William L. Sikes
*Assistant Examiner*—Ron Trice
*Attorney, Agent, or Firm*—Millen, White, Zelane, & Branigan, P.C.

[57] ABSTRACT

An electro-optical display device comprising a liquid crystal layer achieves switching using an electric field component which is predominantly parallel to the surface of the liquid crystal layer. Low dependence of image contrast on viewing angle is achieved by selection of parameters including orientation angle $\beta_o$ and pretilt angle $\alpha_o$ of the liquid crystal molecules in the layer. For example, good results are achieved when $0° < \beta_o \leq 20°$ for liquid crystal molecules having negative dielectric anisotropy and $70° \leq \beta_o < 90°$ for molecules having positive dielectric anisotropy. Preferably, $0° \leq \alpha_o < 30°$.

127 Claims, 8 Drawing Sheets

OTHER PUBLICATIONS

Aviram et al., "Surface Reorientation Liquid Crystals Display Device", *IBM Technical Disclosure Bulletin*, vol. 15, No. 6, Nov. 1972, pp. 1812–1813.

Soref, "Field Effect in Nematic Liquid Crystals Obtained with Interdigital Electrodes," in *Journal of Applied Physics*, vol. 45, No. 12, Dec. 1974, pp. 5466–5468.

Soref, "Interdigital Twisted–Nematic displays," in *Proceedings of the IEEE*, Dec. 1974:1710–1711.

Fahrenschon et al., "Deformation of a Pretilted Nematic Liquid Crystal Layer in an Electric Field," in *Applied Physics*, 11:67–74 (1976), pp. 67–74.

Schadt et al., "Electro–Optical Performance of a New, Black–White and Highly Multiplexable Liquid Crystal Display" in *Applied Physics Letter* 50 (5), 2 Feb. 1987, pp. 236–238.

Scheffer et al. "Investigation of the Electro–Optical Properties of 270° Chiral nematic Layers in the Birefringence Mode" in *J. Applied Physics* 58 (8), 15 Oct. 1985, pp. 3022–3031.

Schadt et al., "Voltage–Dependent Optical Activity of a Twisted Nematic Liquid Crystal" in *Applied Physics Letter*, vol. 18, No. 4, 15 Feb. 1971, pp. 127–128.

Pohl et al., "Low–Delta–n–Twisted Nematic Cell with Improved Optical Properties" in *Applied Physics Letter* 38 (7), 1 Apr. 1981, pp. 497–499.

Soref, "Transverse Field Effects in Nematic Liquid Crystals", Appl. Phys. Lett., vol. 22, No. 4, pp. 165–166, 15 Feb. 1973.

Cognard, *Molecular Liquid Crystals*, Supplement pp. 1–77, (1987).

LIQUID CRYSTAL SWITCHING ELEMENTS HAVING A PARALLEL ELECTRIC FIELD AND $\beta_O$ WHICH IS NOT 0° OR 90°

This is a continuation of application Ser. No. 08/363,968 filed Dec. 23, 1994 now abandoned; which is a continuation of application Ser. No. 07/877,187 filed Aug. 6, 1992 now abandoned.

BRIEF DESCRIPTION OF THE INVENTION

The invention relates to an electrooptical liquid crystal switching element, comprising a liquid crystal layer and a reorientation means for reorienting the liquid crystal layer into a current orientation in which the electrooptical switching element has a different light transmission, the reorientation means comprising a field-generating structure having a field component oriented predominantly in parallel with the liquid crystal layer.

BACKGROUND OF THE INVENTION

An electrooptical liquid crystal switching element is known from U.S. Pat. No. 3,854,751. In this liquid crystal switching element two electric fields are generated by the field-generating structure, one of which has a field component oriented predominantly in parallel with the liquid crystal layer, while the other has a field component oriented predominantly perpendicularly to the liquid crystal layer, the liquid crystal being connected with one electric field to the condition of minimum light transmission and with the other electric field to the condition of maximum light transmission by orienting the optical axis of the liquid crystal through one electric field perpendicularly to the liquid crystal layer and through the other electric field in parallel with the liquid crystal layer. In those cases in which compensated cholesteric liquid crystals are used which in the absence of electric fields orient spontaneously in such a way that their optical axis is oriented perpendicularly to the liquid crystal layer, one electric field is optionally dispensed with, although according to U.S. Pat. No. 3,854,751 it is to be preferred in these cases as well to use both fields because the inherent orientation period of the self-orienting liquid crystals is relatively long and thus very unfavorable.

DE 24 59 533 A1 and DE 23 58 581 B2 also disclose electrooptical liquid crystal switching elements having a reorientation means with a field-generating structure whose electric field has a field component oriented predominantly in parallel with the liquid crystal layer. However, similar to the liquid crystal switching element according to U.S. Pat. No. 2, 854,751, two electric fields perpendicular to each other are generated in the liquid crystal switching element according to DE 23 28 581 B2 to orient the optical axis of the liquid crystal in two orientations extending perpendicularly to each other, one of which orientations extends in parallel with and the other extends perpendicularly to the liquid crystal layer. This kind of reorientation of the optical axis of the liquid crystal also takes place in the liquid crystal switching element according to DE 24 59 533 A1, the compulsory orientation of the optical axis of the liquid crystal taking place perpendicularly to the liquid crystal layer by means of homeotropic boundary orientation of the liquid crystal.

Finally, WO 84/04601 discloses with respect to a liquid crystal, a comb-like field-generating structure whose field has a field component oriented predominantly in parallel with the liquid crystal layer. However, the means according to this citation is an optical guide in which the coupling-out of light is controlled by a change of the effective refractive index of the nucleus consisting of the liquid crystal or the cover formed by the liquid crystal by means of the field-generating structure.

Furthermore, JP 1-33521 (A) in Pat. Abstr. Jap. P-875, May 23, 1989, Vol. 13, No. 219, discloses electrodes in parallel planes, however, for the purpose of generating a storing scattering condition in an optical liquid crystal modulator.

In addition JP 1-179912 (A) in Pat. Abstr. Jap. P 946, Oct. 18, 1989, Vol. 13, No. 460, and JP 1-161217 (A) in Pat. Abstr. Jap. P-936, Sep. 25, 1989, Vol. 13, No. 428, describe liquid crystal indicating element components serving for improving the blocking state of a display, twisted liquid crystals having a certain orientation being used. Besides JP 1-44422 (A) in Pat. Abstr. Jap. P-880, Jun. 7, 1989, Vol. 13, No. 242, describes a liquid crystal indicating element in which the nematic liquid crystal has an orientation with a pretilt angle of 20° to 30°. However, this is a conventional liquid crystal structure in which the optical axis of the liquid crystal can be switched between a direction parallel with and perpendicular to the liquid crystal layer by applying an electric field.

Finally, GB 1 506 570 and JP 54-17756 (A) in Pat. Abstr. Jap. E-101, Mar. 30, 1979, Vol. 3, No. 38, discloses liquid crystal indicators having an optical compensator or reflector as well as dichroic dyes.

Further known electrooptical liquid crystal switching elements are described e.g. by M. Schadt and F. Leenhouts in "Appl. Phys. Lett.", Vol. 50 pages 236 et seq. (1987), as well as by T. J. Scheffer and J. Nehring in "J. Appl. Phys.", Vol. 58 pages 3022 et seq. (1985), furthermore by L. Phl., G. Weber, R. Eidenschink, G. Baur and W. Fehrenbach in "Appl. Phys Lett.", Vol. 38 pages 497 et seq. (1981) and by M. Schadt and W. Helfrich in "Appl. Phys. Lett.", Vol. 18 pages 127 et seq. (1971).

Electrooptical liquid crystal switching elements are used particularly in liquid crystal display means, such as display screens of TV sets, computers, distributing centers and other facilities, installations or the like for changing the image spots of this liquid crystal display means, i.e. for changing the brightness and/or color of an image spot.

In the case of the formerly known and presently commercially available liquid crystal display means, which are also referred to as liquid crystal displays, the observation or viewing angle range, i.e., the angle range from which an image generated by means of the liquid crystal display means can be seen without essential optical misrepresentation, is restricted considerably because the contrast of the image depends on the viewing angle to a considerably strong extent.

As is shown by enclosed investigation results, this dependence of the contrast of the known liquid crystal display means on the angle is due to the former reorientation of the optical axis of the liquid crystal layer between an orientation in parallel with the liquid crystal layer and an orientation perpendicular to the liquid crystal layer. The investigations conducted within the scope of the present invention served for determining that it is the deformation of the liquid crystal effected by such a reorientation which results in a very marked dependence of the transmission of the liquid crystal switching element, and thus the contrast, on the viewing angle.

SUMMARY OF THE INVENTION

Due to the present invention it has now been found that the dependence of the transmission, and thus the contrast, on the viewing angle is largely eliminated in an electrooptical liquid crystal switching element of the kind mentioned at the beginning, particularly one having non-ferroelectric liquid crystal, when the electrooptical liquid crystal switching element is developed according to the invention in such a way that (a) the liquid crystal has a twistable structure and the amount of light transmission through the liquid crystal depends on its degree of twist;

(b) the liquid crystal is anchored in an alignment in the initial state in which it is in the untwisted or twisted state and its twisting axis remains perpendicularly or substantially perpendicular to the liquid crystal layer; and (c) the field component of the reorientation means oriented predominantly in parallel with the liquid crystal layer can be varied in such a way that, for adjusting different light transmission degrees, the degree of twist of the liquid crystal is thereby changed by twisting the optical axis thereof in parallel or substantially in parallel with the liquid crystal layer.

In this way, the disadvantageous deformation of the liquid crystal effected by the former reorientation is largely eliminated and the transmission and contrast become essentially independent of the viewing angle.

The indication that the twisting axis remains "substantially" perpendicular to the liquid crystal layer and that the optical axis is twisted "substantially" in parallel with the liquid crystal layer is to mean that a certain pretilt angle $\alpha_0$ between 020 and 30° may be provided which is included by the alignment in the initial state of the liquid crystal layer at least on its layer side of the liquid crystal layer facing the field-generating structure and a plane in parallel with the liquid crystal layer. Here, the term alignment in the initial state of the liquid crystal layer is understood to mean the preferred direction of the molecular axes of the liquid crystal in the alignment in the initial state of the liquid crystal layer.

The liquid crystal switching element according to the invention is preferably developed in such a way that the field component of the reorientation means oriented predominantly in parallel with the liquid crystal layer can be varied such that the twisting degree of the liquid crystal is changed continuously or stepwise for the continuous or stepwise adjustment of varying light transmission degrees in the range between essentially maximum and minimum light transmission.

As shown by the investigation enclosed results regarding the dependence of the transmission on the viewing angle in the case of liquid crystal switching elements according to the invention, the transmission has virtually no dependence on the viewing of the liquid crystal switching elements.

The electric field having the field component oriented predominantly in parallel with the liquid crystal layer can be obtained by using a field-generating structure comprising strip or line-type electrodes which extend in parallel with one another and in parallel with the liquid crystal layer and to which a different electric potential is applied alternately.

Preferred embodiments of such a field-generating structure are developed in such a way that (a) the strip or line-type electrodes are arranged alternately in at least two planes in parallel with the liquid crystal layer, wherein the two planes may be formed particularly by the two opposite surfaces of an insulating sheet, thin plate, layer or the like; or (b) the strip or line-type electrodes to which a different potential has been applied are arranged in the same plane in a comb-like engagement, wherein this plane can be formed particularly by the surface, facing the liquid crystal layer, of a substrate confining the liquid crystal layer or an insulating sheet, thin plate, layer or the like applied on such a substrate.

A further development of the electrooptical liquid crystal switching element according to the invention distinguishes itself in that the field component oriented predominantly in parallel with the liquid crystal layer forms an angle of orientation which is greater than 0° and less than 90°, with the preferred direction which the liquid crystal layer has on its layer side facing the field-generating structure in its alignment in the initial state. In this way, domain formation by a different rotation sense of adjacent liquid crystal switching elements or element areas is prevented, on the one hand, and short switching periods are achieved, on the other hand, since a clearly oriented initial torque of sufficient quantity results when the electric field is switched on due to the acute angle existing between the field component extending predominantly in parallel with the liquid crystal layer and the alignment in the initial state of the liquid crystal layer on its layer side facing the field-generating structure. The sense of rotation is given by this torque and thus the liquid crystal switching element is switched within the shortest possible period.

This liquid crystal switching element is preferably developed in such a way that (a) the angle of orientation is greater than 70° and less than 90° when the dielectric anisotropy of the liquid crystal is positive or that (b) when the liquid crystal has a negative dielectric anisotropy, the angle of orientation is less than 20° and greater than 0°.

When liquid crystal materials having positive dielectric anisotropy are used, a torque is induced which rotates the preferred direction (director) of the liquid crystal in the direction of the electric field, while when liquid crystal materials having negative dielectric anisotropy are used a torque is induced which rotates the preferred direction (director) in a plane perpendicular to the direction of the electric field. As outlined above, the angle of orientation should not be less than |70°| in the case of positive $\Delta\epsilon$ and not greater than |20°| in the case of negative $\Delta\epsilon$, in regard of the electrooptical characteristics and switching times.

A liquid crystal material, particularly a non-ferroelectric liquid crystal material, of negative dielectric anisotropy $\Delta\epsilon$ is particularly preferred in the liquid crystal switching element according to the invention, since another kind of domain formation can be eliminated by this when, in addition to the component oriented in parallel with the liquid crystal layer, the electric field also has a component oriented perpendicularly thereto, which is usually the case in practice. For example, such a case is given when the electric field, as occurs preferably, is generated by strip or line-type electrodes, since then a component also effective in the case of high fields is also present perpendicular to the liquid crystal layer together with the component extending in parallel with or almost in parallel with the liquid crystal layer. In the case of liquid crystal materials having positive $\Delta\epsilon$ this results in a reorientation of the liquid crystal in the case of high fields, in which the preferred direction is turned out of the plane of the liquid crystal layer. This is accompanied by domain formation, undesired in many cases, so that only the lower range of the electrooptical characteristic becomes usable. In the case of materials having a negative $\neq\epsilon$, this field component induces a torque rotating the preferred direction of the liquid crystal in the plane of the liquid crystal layer. The above-described reorientation is thus prevented, and a considerably greater portion of the electrooptical characteristic becomes usable.

Another important development of the liquid crystal switching elements according to the invention distinguishes itself in that, at least on its layer side facing the field-generating structure, the alignment in the initial state of the liquid crystal layer includes a pretilt angle greater than 0° and less than 30° with a plane in parallel with the liquid crystal layer.

This serves for obtaining a favorable deformability of the liquid crystal when the electric field is applied directly adjacent to the anchoring layer for the liquid crystal.

With respect to the alignment in the initial state of the liquid crystal it is preferred that (a) the liquid crystal has an untwisted structure in its alignment in the initial state and can be reoriented into a twisted structure by the field component oriented predominantly in parallel with the liquid crystal layer, in which structure the axis of twisting is perpendicular to the liquid crystal layer, or that (b) the liquid crystal has a twisted structure in its alignment in the initial state whose axis of twisting is perpendicular to the liquid crystal layer and which can be detwisted by the field component oriented predominantly in parallel with the liquid crystal layer.

The other fundamental design of the liquid crystal switching elements is preferably developed in such a way that (1) a polarizer is provided on one side of the liquid crystal layer to operate the electrooptical liquid crystal switching element in the direct-light mode and an analyzer is provided on the other side; or that (2) for operating the electrooptical liquid crystal switching element in the reflection mode a polarizer/analyzer is provided on one side of the liquid crystal layer and a reflector is provided on the other side.

In this case, a birefringent optical compensator can be provided between the liquid crystal layer and the polarizer. When a separate analyzer is provided as in the former case, the optical compensator can also be provided between the liquid crystal layer and the analyzer instead.

In particular, the liquid crystal layer may contain a dichroic dye, and a polarizer can be provided on at least one side thereof.

Preferably, the liquid crystal switching element is further developed in such a way that its light transmission has its maximum or minimum amount in the alignment in the initial state of the liquid crystal layer and can be varied up to its other extreme value in reoriented states of the liquid crystal layer.

It is especially preferred to use the liquid crystal switching element according to the invention for varying the brightness and/or color of an image spot of an electrooptical display means, the latter being preferably a display screen. The liquid crystal switching elements of the electrooptical display means can be controlled particularly by a transistor matrix or by a direct driver means according to the time multiplex method.

BRIEF DESCRIPTION OF THE FIGURES

The above as well as further advantages and features of the invention are to be explained in more detail below by means of preferred embodiments of electrooptical liquid crystal switching elements according to the invention with reference to FIGS. 1 to 7. Insofar as they relate to the design of preferred embodiments of electrooptical liquid crystal switching elements according to the invention, these figures are not true to scale intentionally for reasons of illustration.

FIG. 2 shows a perspective view of an embodiment of an electrooptical liquid crystal switching element according to the invention for direct-light mode;

The following detailed description of preferred embodiments of the invention refers initially to FIGS. 1 and 2. FIG. 1 shows a cross-section through an embodiment of an electrooptical liquid crystal switching element for direct-light mode in the assembled condition, while FIG. 2 illustrates an exploded view of the individual parts of the same liquid crystal switching element which is reduced in scale with respect to FIG. 1. Furthermore, the lower orientation layer and the lower insulating layer shown in FIG. 2 are outlined as plane layers in contrast to FIG. 1, for reasons of representation.

Figure 1:
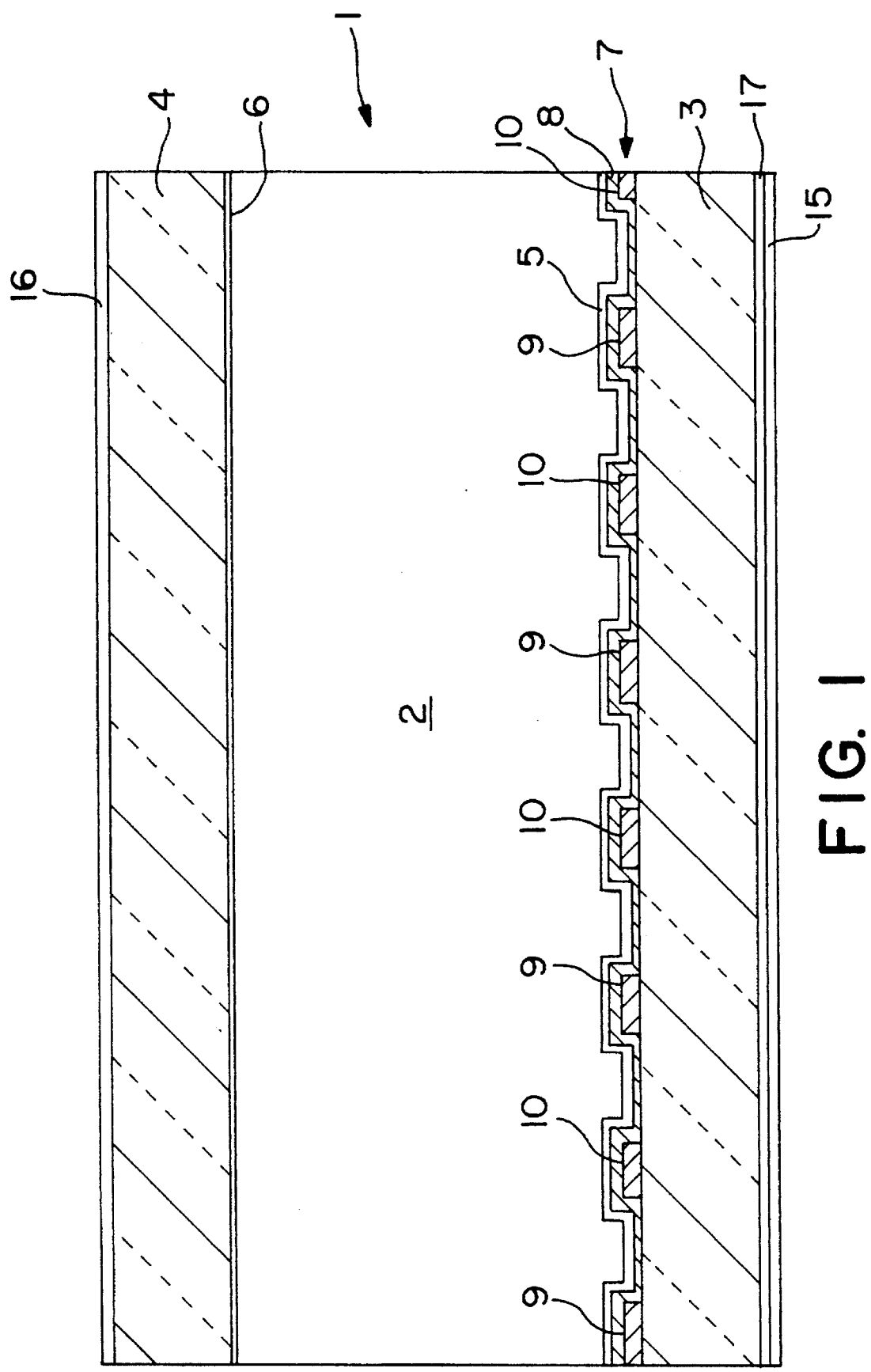
FIG. 1 shows a partial section through an embodiment of an electrooptical liquid crystal switching element according to the invention, which preferably forms an image spot of an electrooptical display means by controlling brightness and/or color, whereby the display screen of such display means comprises a plurality of such liquid crystal switching elements integrated in a two-dimensional matrix arrangement.

The electrooptical liquid crystal switching element 1 for direct-light mode as shown in FIGS. 1 and 2 comprises a liquid crystal layer 2 included between two substrates 3 and 4 referred to below as lower and upper substrates corresponding to the drawing, even though they may adopt any position in practice. These substrates 3 and 4 are preferably glass substrates, however, they may also consist of other suitable transparent, preferably insulating, materials such as plastics. In addition, substrates 3 and 4 are preferably developed planely and in parallel with each other, so that the liquid crystal layer 2 is preferably a substantially plane or planar layer.

In order to hold the liquid crystal layer 2 with a predetermined alignment in the initial state within the liquid crystal switching element 1, it does not border directly on the two substrates 3 and 4 but rather on respective orientation layer 5 and 6, which are referred to below as lower and upper orientation layers for the drawing. The upper orientation layer 6 is directly applied to the upper substrate 4, whereas a field-generating structure 7 and optionally an insulating layer 8 are provided between the lower substrate 3 and the lower orientation layer 5, so that the field-generating structure 7, the insulating layer 8 and the lower orientation layer 5 are applied onto the lower substrate 3 in the above-indicated order.

The field-generating structure 7 comprises strip or line-type electrodes 9 and 10 which extend in parallel with one another and in parallel with the liquid crystal layer 2. The strip or line-type electrodes 9 alternate with the strip or line-type electrodes 10 as shown in FIGS. 1 and 2. The strip or line-type electrodes 9 are connected to a differing electric potential with respect to the strip or line-type electrodes 10, so that one electric field each is generated between the strip or line-type electrodes 9 and 10, which has a field component oriented predominantly in parallel with the liquid crystal layer 2. For example, the strip or line-type electrodes 9 are connected to one electric pole of a voltage source 11, whereas the strip or line-type electrodes 10 are connected to the other electric pole of this voltage source 11, as shown in FIG. 2. Although the voltage source 11 is illustrated as a direct-current source on grounds of principle and in principle could also be such a direct-current source, an ac voltage source 11 is used in practice to avoid degradation of the liquid crystal layer and the difficulties which it implies.

Figure 2A:
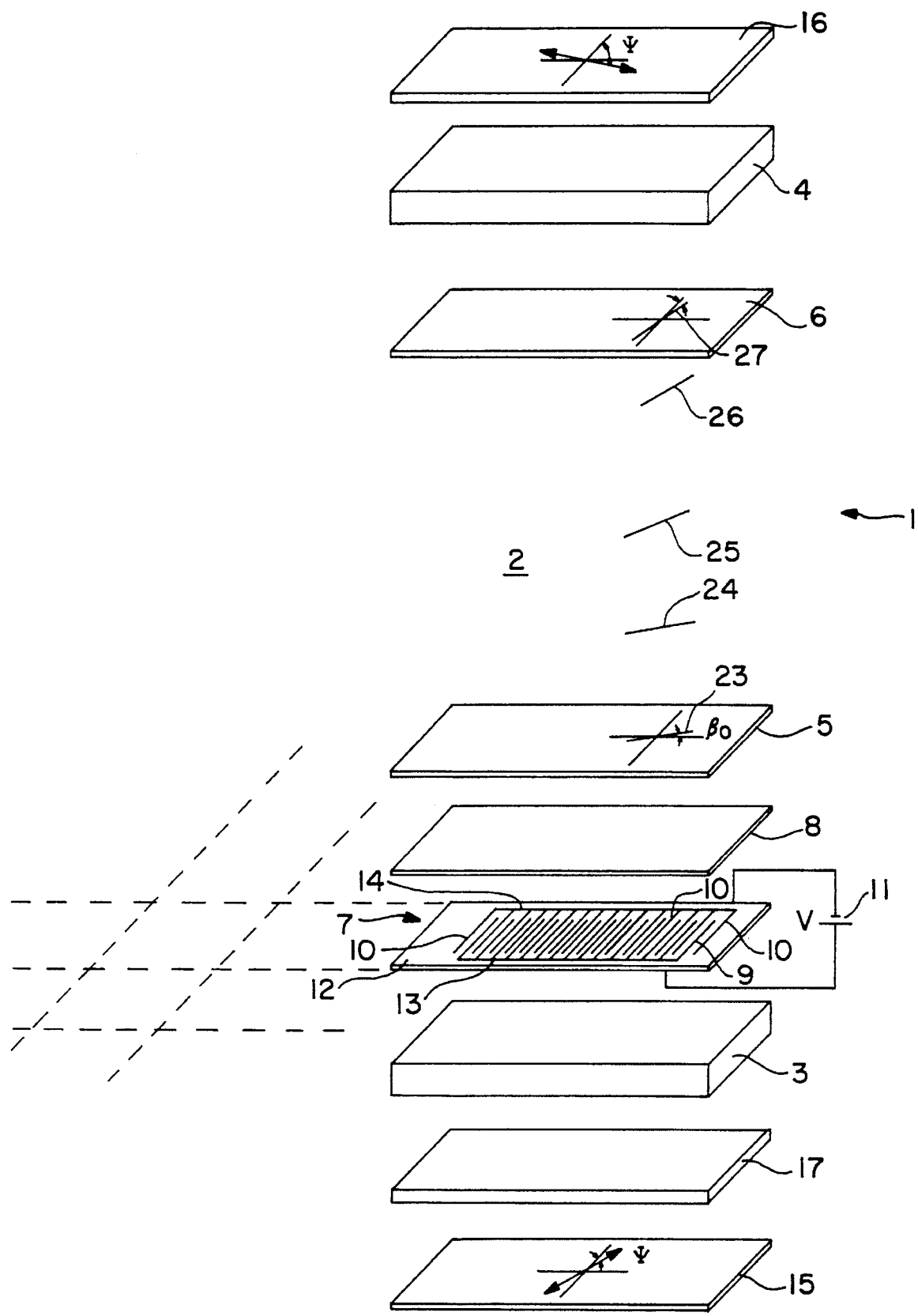
FIG. 2a illustrates a matrix embodiment of the display device of this invention.
Figure 2B:
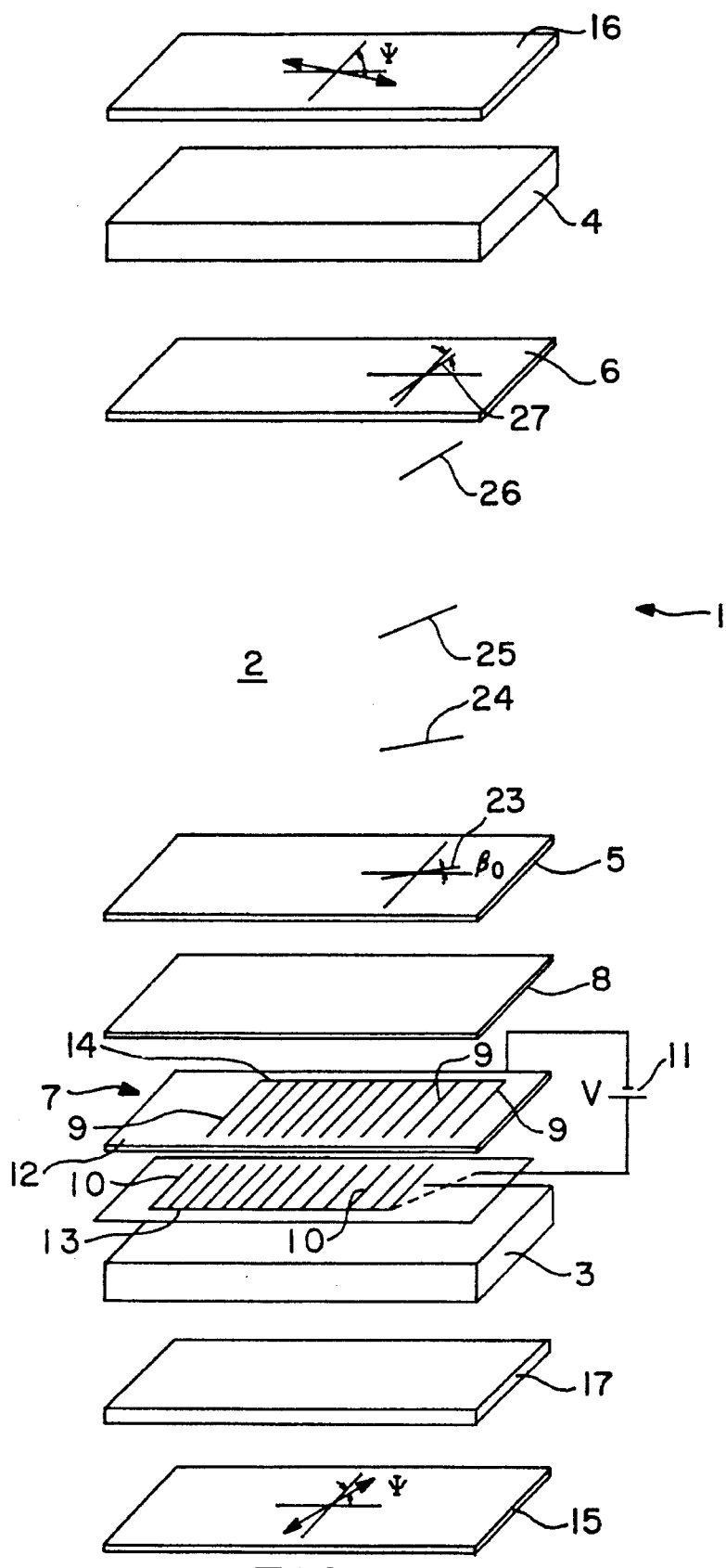
FIG. 2b shows a variant of FIG. 2 where the electrodes are arranged alternately in two planes.
Figure 3:
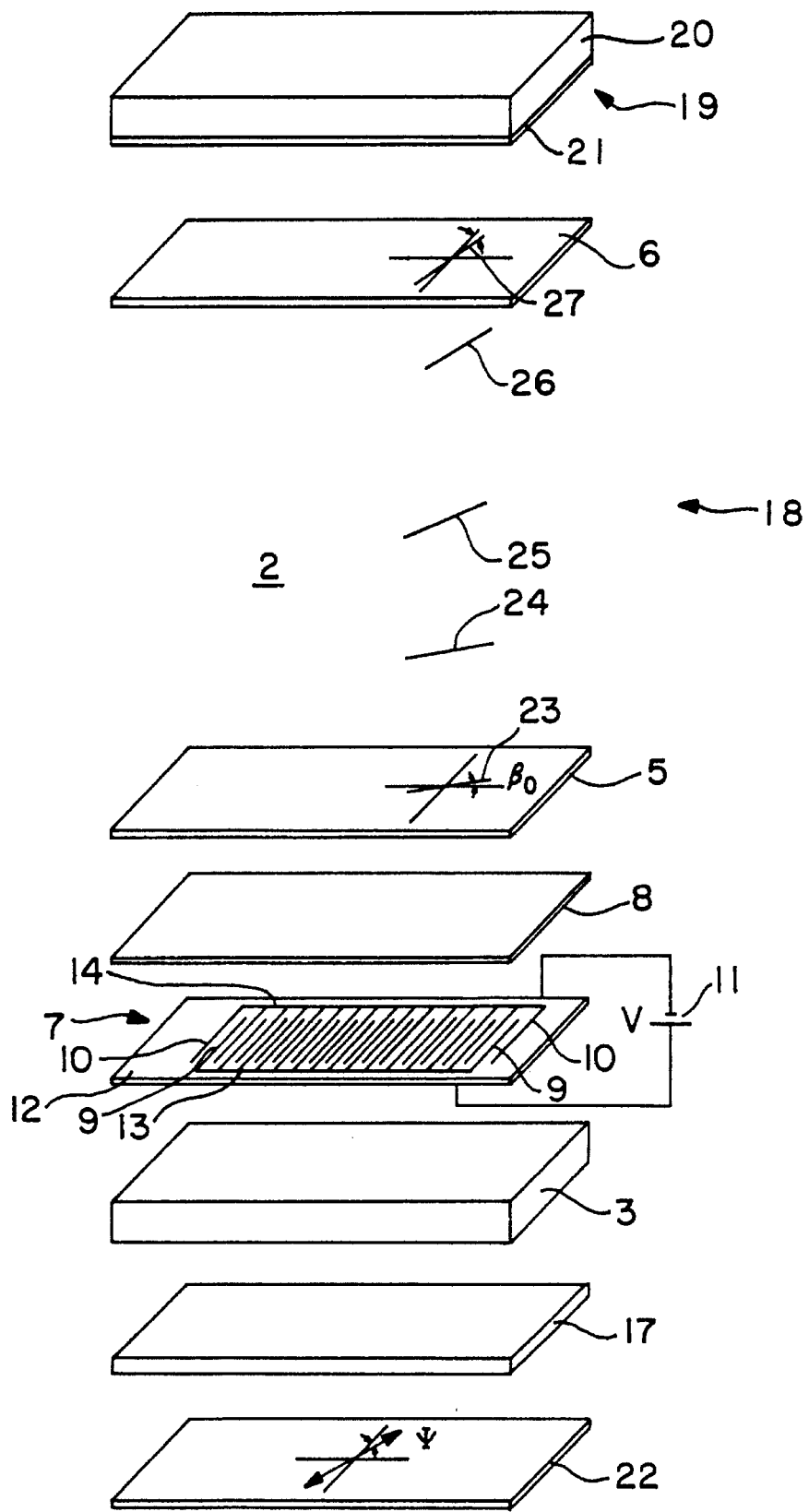
FIG. 3 shows a perspective view of an embodiment of an electrooptical liquid crystal switching element according to the invention for reflection mode.

The strip or line-type electrodes 9 and 10 are developed in comb-like engagement in the same plane in the presently shown embodiment of the liquid crystal switching element 1, namely on the surface of an insulating base layer 12, which may also be formed by the surface of substrate 3, in that the strip or line-type electrodes 9 are electrically connected with each other to give a first comb structure by a strip or line-type transverse electrode extending transversely, in particular perpendicularly, thereto and in that the strip or line-type electrodes 10 are electrically connected to each other to give a second comb structure by another strip or line-type transverse electrode extending transversely, in particular perpendicularly, thereto and in that furthermore the two comb structures are arranged in meshing engagement, as is illustrated especially well in FIGS. 2 and 3.

Another possibility shown in FIG. 2B consists in that the strip or line-type electrodes 9 are arranged on the upper side of the insulating base layer 12, whereas the strip or line-type electrodes 10 are arranged on the lower side of the insulating base layer 12, or vice versa. In this case, the strip or line-type electrodes can be developed as simple parallel strips or lines, without comb-like structures becoming necessary.

Furthermore, the liquid crystal switching element 1 shown in FIGS. 1 and 2 also comprises a polarizer 15 on the outer side of the substrate 3 and an analyzer 16 on the outer side of substrate 4. Depending on the passage of light direction, polarizer and analyzer may also be exchanged. Finally, an optical compensator 17 is provided between the polarizer 15 and the substrate 3. This optical compensator 17 may also be arranged between the analyzer 16 and the substrate 4 instead.

FIG. 3 shows a perspective view of an embodiment of an electrooptical liquid crystal switching element 18 for reflection mode in an exploded view of the individual parts of this liquid crystal switching element 18. It differs with respect to its outer design from the liquid crystal switching element 1 according to FIGS. 1 and 2 only in that a reflector 19 is provided instead of the analyzer 16 shown in FIGS. 1 and 2, which in the present embodiment consists of a substrate 20, e.g. a glass substrate, and a reflection layer 21 provided on the side of the substrate 20 facing the liquid crystal layer 2. Corresponding to this design the still remaining polarizer is simultaneously the analyzer and is therefore referred to as polarizer/analyzer 22 to differentiate it from that of FIGS. 1 and 2.

Figure 4:
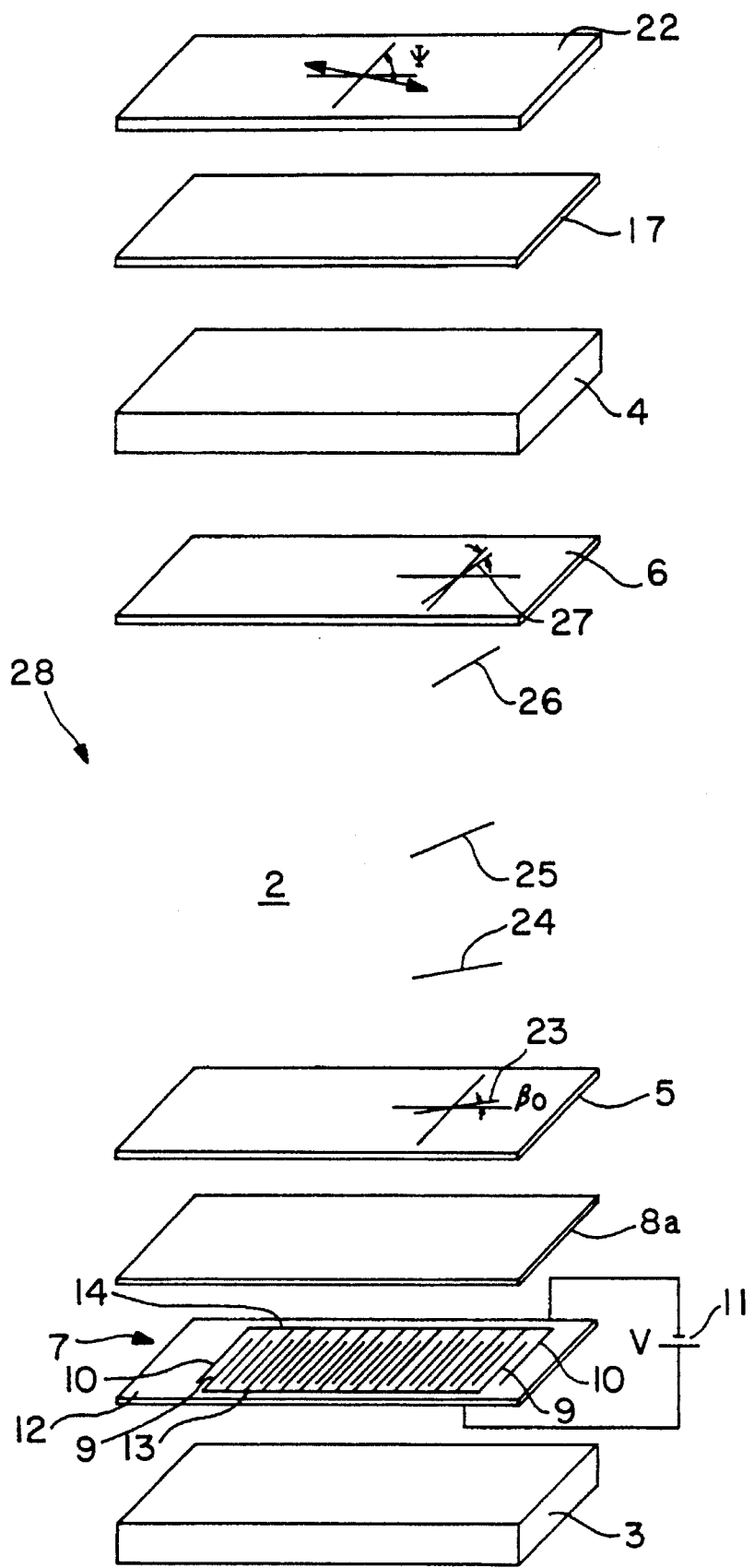
FIG. 4 shows a perspective view of another embodiment according to the invention.

Another embodiment of an electrooptical switching element 28 for reflection mode, which is shown in FIG. 4, differs from the electrooptical switching element 1 according to FIGS. 1 and 2 e.g. in that a dielectric mirror 8a is provided instead of the insulating layer 8. In addition, a birefringent compensator 17 is optionally provided between substrate 4 and analyzer 16. An analyzer/polarizer 22 is provided as the analyzer 16, which then acts as a polarizer and analyzer, so that the polarizer 15 of FIGS. 1 and 2 is dispensed with. This embodiment has the special advantage that neither the electrode structure 7 nor the substrate 3 have to be transparent when the dielectric mirror 8a is provided between the liquid crystal 2, on the one hand, and the arrangement of electrode structure 7 and substrate 3, on the other hand, as shown in FIG. 4. In this case, the orientation layer 5 is located between the liquid crystal 2 and the dielectric mirror 8a. The orientation layer 5 can also be a component of the dielectric mirror 8a. The electrode structure 7 can also be provided on the dielectric mirror 8a, particularly on its side facing the liquid crystal 2.

Furthermore, since the outer design of the liquid crystal switching element 18 and 28 is as for the rest equal to that of the liquid crystal switching element 1, the same reference numbers are used as in FIGS. 1 and 2, so that reference is made to the corresponding explanations of FIGS. 1 and 2 to avoid repetitions.

Dealt with below in more detail is the inner design of the liquid crystal switching elements 1, 18 and 28, i.e. with the respective parameters of the liquid crystal layer, the orientation layers, the polarizers, the field-generating structure, etc., all of which are important for the operation of the liquid crystal switching element 1, 18 and 28. They are shown in the below Table 1 and contained in FIGS. 2 and 3 insofar as possible:

TABLE 1

The following parameters are used to describe preferred embodiments of the liquid crystal switching elements with respect to their physical development:

| | |
|---|---|
| $\beta$ | = twist angle of the liquid crystal 2 in its alignment in the initial state, i.e. angle between the director at substrate 3 or in the orientation layer 5 and the director at substrate 4 or in the orientation layer 6. |
| $\beta_o$ | = angle of orientation of the electric field component oriented predominantly in parallel with the liquid crystal layer 2, which is |

TABLE 1-continued

The following parameters are used to describe preferred embodiments of the liquid crystal switching elements with respect to their physical development:

|  |  |
|---|---|
|  | generated by the field-generating structure 7, to the preferred direction of the molecule axes of the liquid crystal 2, which have them in the alignment in the initial state of the liquid crystal 2 on the layer side of the liquid crystal layer 2, which faces the field-generating structure 7, i.e. at the orientation layer 5; this angle equals the angle between the director at substrate 3 or in the orientation layer 5 and the normal to the longitudinal direction of the strip or line-type electrodes 9, 10 in the plane of these strip or line-type electrodes. |
| $\alpha_o$ | = pretilt angle which is included by the alignment in the initial state of the liquid crystal layer 2 at least on its layer side of the liquid crystal layer 2 facing the field-generating structure 7 and a plane in parallel with the liquid crystal layer 2, the alignment in the initial state of the liquid crystal layer being here understood to mean the preferred direction of the molecule axes of the liquid crystal 2 in the alignment in the initial state of the liquid crystal layer. |
| $\psi$ | = angle between the director at substrate 3 or in the orientation layer 5 and the transmitting direction of the polarizer 15 and the polarizer/analyzer 22, respectively. |
| $\psi'$ | = angle between the director at substrate 3 or in the orientation layer 5 and the transmitting direction of analyzer 16. |
| $\|\psi-\psi'\|$ | = angle between the transmitting direction of polarizer and analyzer. |
| d | = thickness of the liquid crystal structure 2 |
| $\epsilon_\|, \epsilon_\perp$ | = dielectric constant in parallel with and perpendicular to, respectively, the director of the liquid crystal |
| $\Delta_\epsilon$ | = dielectric anisotropy of the liquid crystal difference between $\epsilon_\|$ and $\epsilon_\perp$ i.e. $\Delta\epsilon = \epsilon_\| - \epsilon_\perp$ |
| $n_o, n_e$ | = regular and irregular, respectively, refractive index of the liquid crystal |
| $\lambda$ | = wavelength of light |
| $\Delta n$ | = $n_e - n_o$. |

Figure 5:
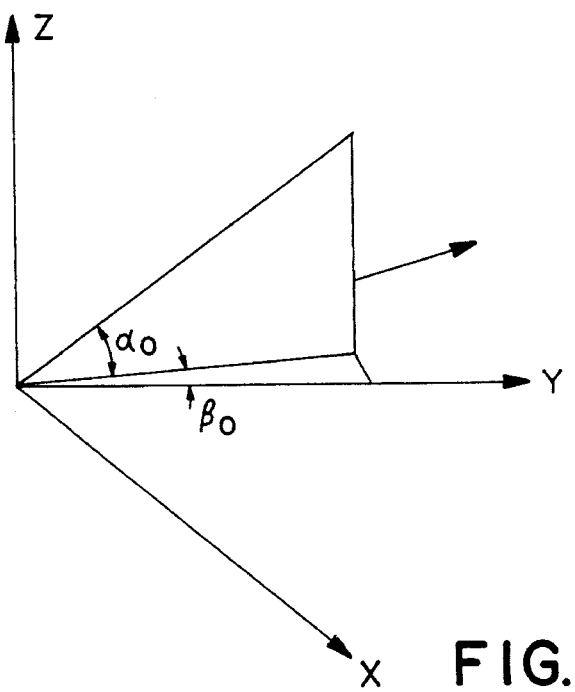
FIG. 5 shows a diagram of the pretilt angle $\alpha_o$ which is preferably included by the alignment in the initial state of the liquid crystal layer and a plane in parallel with the liquid crystal layer, as well as the orientation angle $\beta_o$ which is formed by the field component, oriented predominantly in parallel with the liquid crystal layer, together with the alignment in the initial state which the liquid crystal layer has on its side facing the field-generating structure.

Arrows 23 to 27 of FIGS. 2 and 3 indicate preferred directions of the liquid crystal 2, the preferred direction at the orientation layer 5 being particularly outlined by arrow 23 and the preferred direction at the orientation layer 6 being especially shown by arrow 27, while arrows 24, 25 and show preferred directions in the intermediate area, which are introduced to better illustrate the liquid crystal twist. The pretilt angle $\alpha_o$ and the angle of orientation $\beta_o$ are shown in FIG. 5, the x and y axes defining a plane extending in parallel with the liquid crystal layer 2, whereas the z axis extends perpendicularly to the liquid crystal layer 2, i.e. corresponds to the direction of thickness of the liquid crystal layer. The x and y axes correspond to the directions of width and length of the liquid crystal 2.

Below Tables 2 and 3 give preferred initial conditions for the direct-light mode and the reflection mode, the initial condition being understood to mean the state present when no electric field is applied via the field-generating structure 7.

TABLE 2

Preferred initial states in homogeneous planar orientation in direct-light mode

| initial state | $\beta$ | $\Delta\epsilon$ | $d \times \Delta n/\lambda$ | $\alpha_0$ | $\beta_0$ | $\psi$ | $\|\psi-\psi'\|$ |
|---|---|---|---|---|---|---|---|
| D1 | 0° ± 15° | >0 | >0, <4 | ≧0°, <30° | >70°, <90° | 0°, 90° | 90°, 0° preferably 90° |
| D2 | 0° ± 15° | <0 | >0, <4 | ≧0°, <30° | >0°, <20° | 0°, 90° | 90°, 0° preferably 90° |
| D3 | 90° ± 15° | >0 | >0, <4 preferably 1/2√3, 1/2√15, 1/2√35 | ≧0°, <30° | >70°, <90° | 0°, 90° | 90°, 0° preferably 0° |
| D4 | 90° ± 15° | <0 | >0, <4 preferably 1/2√3, 1/2√15, 1/2√35 | ≧0°, <30° | >0°, <20° | 0°, 90° | 90°, 0° preferably 0° |

TABLE 3

Preferred initial states in homogeneous planar orientation in reflection mode

| initial state | $\beta$ | $\Delta\epsilon$ | $d \times \Delta n/\lambda$ | $\alpha_0$ | $\beta_0$ | $\psi$ | $\|\psi-\psi'\|$ |
|---|---|---|---|---|---|---|---|
| R1 | 0° ± 15° | >0 | >0, <2 preferably 0.36 | ≧0°, <30° | >70°, <90° | 0°, 90° | 90°, 0° preferab. 90° |
| R2 | 0° ± 15° | <0 | >0, <2 preferably | ≧0°, <30° | >0°, <20° | 0°, 90° | 90°, 0° preferab. 90° |

TABLE 3-continued

| | Preferred initial states in homogeneous planar orientation in reflection mode | | | | | | |
|---|---|---|---|---|---|---|---|
| initial state | β | Δε | d × Δn/λ | $\alpha_o$ | $\beta_o$ | ψ | |ψ−ψ'| |
| R3 | 60° ± 5° | >0 | 0.36 >0, <2 preferably 0.36 | ≧0°, <30° | >70°, <90° | 0°, 90° | 0°, 90° |
| R4 | 60° ± 5° | <0 | >0, <2 preferably 0.36 | ≧0°, <30° | ≦0°, <20° | 0°, 90° | 0°, 90° |

Reference is now made to the fact that the statement made on the values of d×Δn/π as well as $\alpha_o$ and $\beta_o$ are ranges, i.e. that the two values provided with the sign ≧ or ≦ or > or < each indicate the two ranges, depending on the sign inclusive or exclusive of this limit.

When the electrooptical liquid crystal switching element 1 or 18 or 28 is used to vary the brightness and/or color of an image spot of an electrooptical display means, the respective liquid crystal switching element 1 or 18 according to FIGS. 1, 2 or 3 forms a single image spot, so that a large plurality of such liquid crystal switching elements 1, 18 or 28 are incorporated into a display screen. The substrates, the orientation layers, the polarizers, the analyzers and the polarizers/analyzers, respectively, the reflectors and the optical compensators, all of which are shown in FIGS. 1 to 3 as individual parts for reasons of representation, each form a component joint, preferably integral, for all image spots, whereas each individual image spot has a field-generating structure 7 of its own. If it is no comb structure of the kind shown in FIGS. 1 to 3, this field-generating structure may also be composed of strip or line-type electrodes extending as a whole through the entire area of the electrooptical display means if it is controlled intersection-wise in corresponding manner, e.g. according to the time multiplex method.

Preferred quantities for the liquid crystal elements are given below, which will apply in particular if the liquid crystal switching elements are used as image spots in an electrooptical display means:

Thickness of the liquid crystal layer: 1 μm to 10 μm area size of the field-generating square having a structure corresponding to one image side length of spot: 10 μm to 1 mm distance between adjacent strip or 2 μm to 50 μm line-type electrodes:

voltage between adjacent strip or 1 volt to line-type electrodes in the case of 80 volts maximum contrast:

Reference is made to the fact that the application of a polarization sheet, i.e. the polarizer/analyzer 22 in front of the reflective liquid crystal switching element 18 or 28, corresponds to parallel polarizers 15, 16 (i.e. an analyzer 16 in parallel with the polarizer 15 in the transmitting direction). The use of a reflective liquid crystal switching element 18 or 28 in combination with a polarizing beam splitter (McNeille prism) corresponds to cross polarizers 15, 16 in the transmissive liquid crystal switching element 1. This arrangement is especially suitable for great light-transmitting projectors.

The function, particularly the optical behavior, of the above-described liquid crystal switching elements 1 and 18 as well as 28 was investigated by means of computer simulation and confirmed by experiments conducted with respect to correspondingly developed liquid crystal switching elements.

Figure 6:
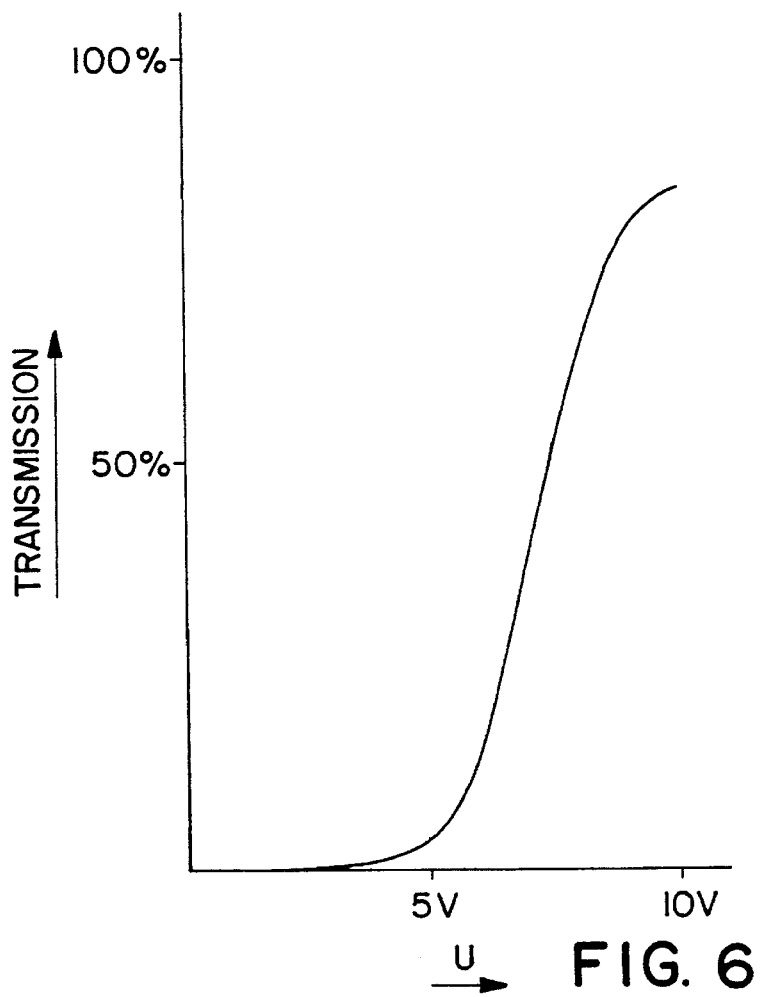
FIG. 6 shows an experimental curve which shows the transmission of the perpendicularly incident light as a function of the applied voltage in the case of a typical embodiment of an electrooptical liquid crystal switching element according to the invention.
Figure 7:
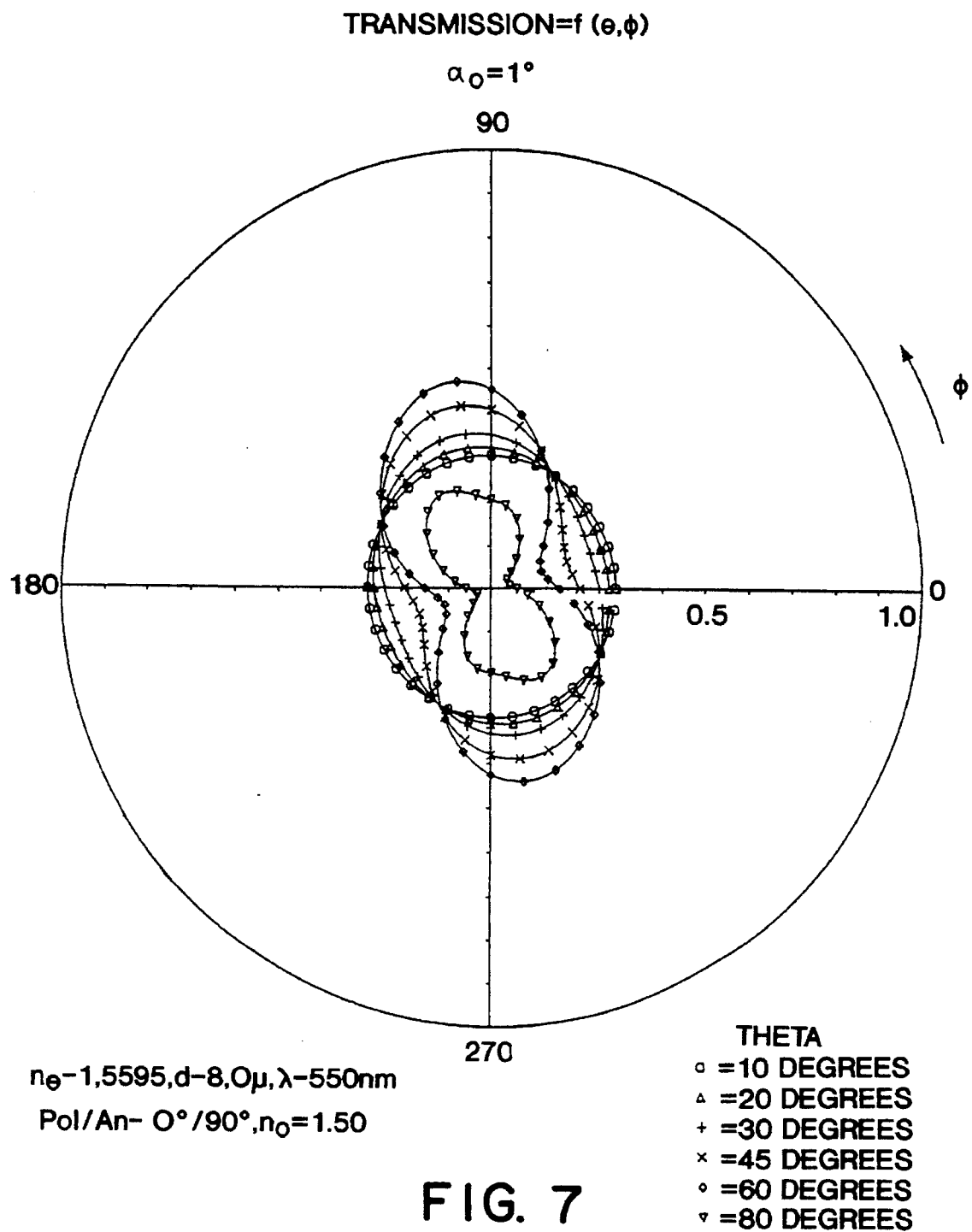
FIG. 7 shows the values for the transmission determined by means of calculation in the case of a typical embodiment of an electrooptical liquid crystal switching element according to the invention.
Figure 8:
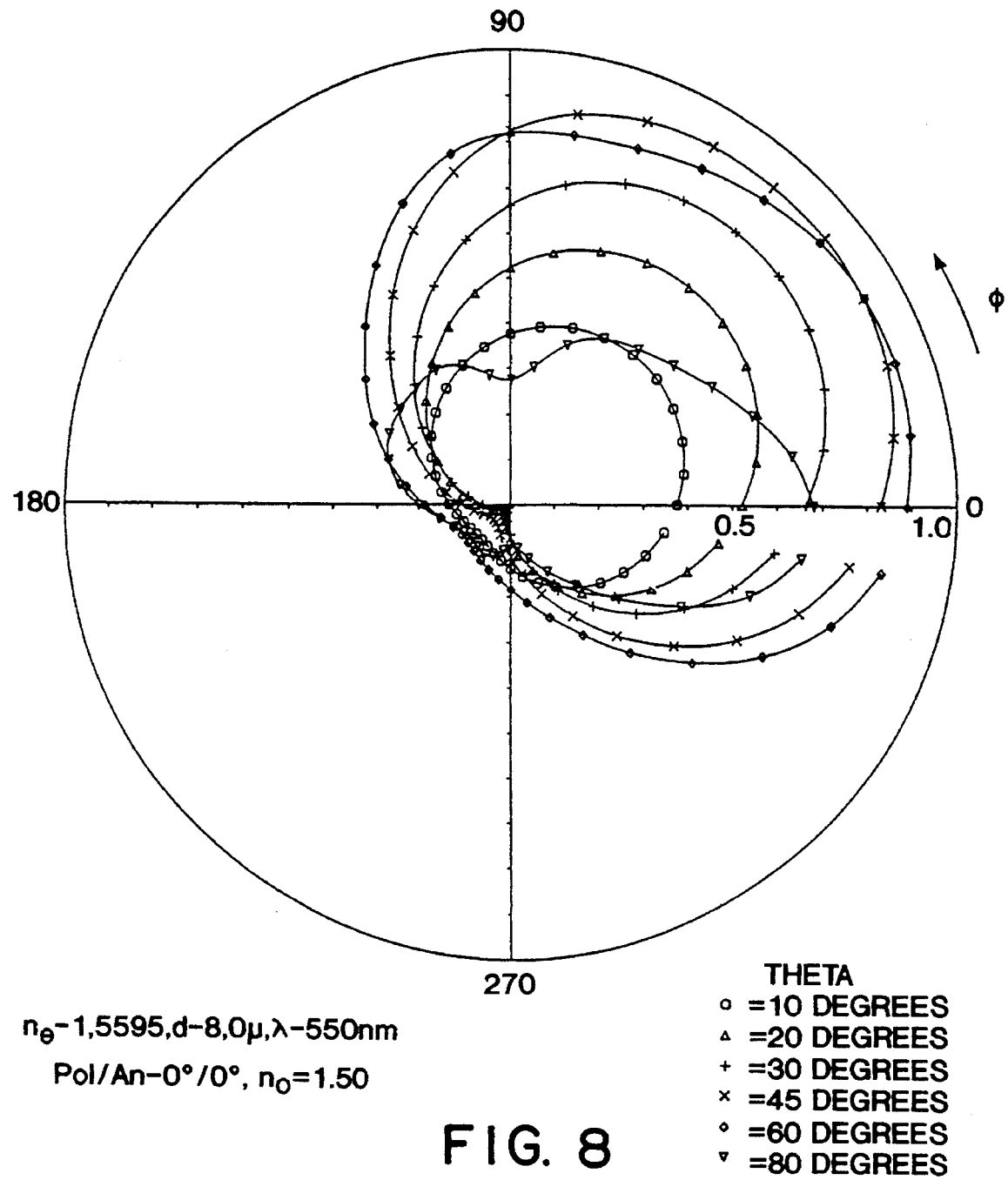
FIG. 8 shows transmission values determined by means of calculation for a known electrooptical liquid crystal TN switching element, which illustrate the dependence of the transmission on the angle using polar coordinates, the scale of the representation being the same as that of FIG. 6, so that a comparison between FIGS. 7 and 8 clearly shows the high dependence of transmission on the angle for the known electrooptical liquid crystal switching elements and as compared thereto virtually no dependence of the transmission on the angle within a large area for the electrooptical liquid crystal switching element according to the invention.

The results of these investigations are shown in FIGS. 6 and 7. FIG. 8 illustrates the result of a comparative investigation made with a TN liquid crystal switching element, i.e. a known liquid crystal switching element having a helical and nematic liquid crystal.

The liquid crystal switching element on which the investigation result of FIG. 6 is based and which was designed according to FIGS. 1 and 2 had the following design quantities:

Thickness of the liquid crystal layer=6.9 μm dielectric anisotropy=−1.5 optical path length d×Δn/η=0.865 twist angle β=0° angle of orientation $\beta_o$=5° pretilt angle $\alpha_0$=5° angle between polarizer and analyzer=90°

The following explanatory statements have to be made on FIGS. 7 and 8, a comparison between which clearly shows the surprising properties of the electrooptical liquid crystal switching element according to the invention over the formerly known liquid crystal switching elements:

The angle of THETA is the angle between the observation direction and the direction normal to the liquid crystal layer. The intensity of the transmission light is indicated on the axes of the polar coordinate presentation. The transmission is about 25% for perpendicular pretilt.

Reference is made to the fact that in the electrooptical switching element 1 according to FIGS. 1 and 2 the orientation layer 6 and the substrate 4 may optionally be dispensed with when liquid crystalline polymers are used, for example. The embodiments of the electrooptical switching elements for reflection mode can be modified correspondingly. Therefore, the term "liquid crystal" also comprises liquid crystalline polymers or other liquid crystalline substances in the present description and claims.

The liquid crystals used for the invention are preferably, however, by no means exclusively, nematic liquid crystals or nematic liquid crystalline polymers.

We claim:

1. An electro-optical display device comprising a plurality of liquid crystal switching elements which comprise:

(a) a liquid crystal layer, comprising liquid crystal molecules and having a surface for display of an image; and (b) an electrode structure for generating an electric field having a component predominantly in parallel with said surface;

wherein said liquid crystal molecules have an orientation angle $\beta_o$ which is larger than zero degrees but not larger than 20 degrees in the case of negative dielectric anisotropy or an orientation angle $\beta_o$ which is not smaller than 70 degrees but less than 90 degrees in the case of positive dielectric anisotropy.

2. The electro-optical display device of claim 1, wherein said switching elements further comprise:

(c) a substrate;

(d) a polarizer in optical relation with said liquid crystal layer; and (e) a voltage source connected to said electrode structure.

3. The electro-optical display device of claim 2, wherein said electrode structure is formed between said substrate and said liquid crystal layer and comprises at least a pair of electrodes having a space therebetween.

4. The electro-optical display device of claim 3, wherein said switching elements further comprise:

(f) an orientation layer, formed between said electrode structure and said liquid crystal layer, having a surface which aligns said liquid crystal molecules in a direction whereby they have said orientation angle $\beta_o$.

5. The electro-optical display device of claim 2, wherein said switching elements further comprise:

(f) an orientation layer, formed between said electrode structure and said liquid crystal layer, having a surface which aligns said liquid crystal molecules in a direction whereby they have said orientation angle $\beta_o$.

6. The electro-optical display device of claim 4, wherein said liquid crystal molecules have a pretilt angle $\alpha_o$, wherein $0°\leq\alpha_o<30°$.

7. The electro-optical display device of claim 6 wherein $0°\leq\alpha_o\leq25°$.

8. The electro-optical display device of claim 6, wherein $0°\leq\alpha_o\leq20°$.

9. The electro-optical display device according to claim 8, wherein the liquid crystal molecules have positive dielectric anisotropy and $\Delta n \cdot d/\lambda$ of said liquid crystal layer is larger than zero but smaller than four, and a twist angle $\beta$ of said liquid crystal layer is within 15 degree of 0° or within 15 degrees of 90°.

10. The electro-optical display device according to claim 8, wherein the liquid crystal molecules have negative dielectric anisotropy and $\Delta n \cdot d/\lambda$ of said liquid crystal layer is larger than zero but smaller than four, and a twist angle $\beta$ of said liquid crystal layer is within 15 degrees of 0° or within 15 degrees of 90°.

11. The electro-optical display device of claim 6, wherein $0°\leq\alpha_o\leq10°$.

12. The electro-optical display device of claim 6, wherein $0°\leq\alpha_o\leq5°$.

13. The electro-optical display device of claim 1, wherein $0°\leq\alpha_o\leq3°$.

14. The electro-optical display device of claim 6, wherein $0°\leq\alpha_o\leq2°$.

15. The electro-optical display device of claim 6, wherein $0°\leq\alpha_o\leq1°$.

16. The electro-optical display device of claim 6, wherein said electric field changes the twisting degree of said liquid crystal molecules continuously or stepwise to provide different degrees of light transmission by said liquid crystal switching elements in the range between substantially maximum and minimum light transmission of said electro-optical display device.

17. The electro-optical display device according to claim 8, which further comprises driver means for direct driving in accordance with a time multiplex method.

18. The electro-optical display device of claim 2, wherein said liquid crystal molecules have a pretilt angle $\alpha_0$, wherein $0°\leq\alpha_0<30°$.

19. The electro-optical display device of claim 18, wherein $0°\leq\alpha_0\leq20°$.

20. The electro-optical display device of claim 18, wherein $0°\leq\alpha_0\leq5°$.

21. The electro-optical display device of claim 2, wherein said electrode structure is arranged alternately in different planes in parallel with said substrate.

22. The electro-optical display device of claim 21, wherein said electrode structure is formed between said substrate and said liquid crystal layer and comprises at least a pair of electrodes having a space therebetween, and said switching elements further comprise:

(f) an orientation layer, formed between said electrode structure and said liquid crystal layer, having a surface which aligns said liquid crystal molecules in a direction whereby they have said orientation angle $\beta_o$.

23. The electro-optical display device of claim 22, wherein said liquid crystal molecules have a pretilt angle $\alpha_o$, wherein $0°\leq\alpha_o<30°$.

24. The electro-optical display device of claim 22, wherein said liquid crystal molecules have a pretilt angle $\alpha_o$, wherein $0°\leq\alpha_o\leq20°$.

25. The electro-optical display device of claim 22, wherein said liquid crystal molecules have a pretilt angle $\alpha_o$, wherein $0°\leq\alpha_o\leq5°$.

26. The electrooptical display device of claim 21, wherein said liquid crystal molecules have a pretilt angle $\alpha_0$, wherein $0°<\alpha_0<30°$.

27. The electro-optical display device of claim 2, 6, 8, 12 or 21, wherein said liquid crystal molecules are nematic.

28. The electro-optical display device of claim 2, 6, 8, 12 or 21, wherein said liquid crystal molecules are twistable.

29. The electro-optical display device of claim 2, 6, 8, 12, or 21, further comprising an analyzer in optical relation with said polarizer.

30. The electro-optical display device according to claim 29, wherein the angle between the orientation direction of said liquid crystal molecules at the surface of said liquid crystal layer on the side of said polarizer and the transmitting direction of said polarizer is approximately zero degrees, and the angle between the transmitting directions of said polarizer and said analyzer is approximately zero degrees or approximately 90 degrees.

31. The electro-optical display device according to claim 29, wherein the angle between the orientation direction of said liquid crystal molecules at a surface of said liquid crystal layer on the side of said polarizer and the transmitting direction of said polarizer is approximately 90 degrees, and the angle between the transmitting directions of said polarizer and said analyzer is approximately zero degrees or approximately 90 degrees.

32. The electro-optical display device of claim 2, 6, 8, 12 or 21, wherein $\Delta n \cdot d/\lambda$ of said liquid crystal layer is larger than zero but smaller than four.

33. The electro-optical display device according to claim 32, wherein the liquid crystal molecules of said liquid crystal have positive dielectric anisotropy, and, for reflection mode, $\Delta n \cdot d/\lambda$ is larger than zero but smaller than two and a twist angle $\beta$ is within 15 degrees of 0° or within 5 degrees of 60°, or, for direct mode, a twist angle $\beta$ is within 15 degrees of 0° or within 15 degrees of 90°.

34. The electro-optical display device according to claim 32, wherein the liquid crystal molecules have negative dielectric anisotropy, and, for reflection mode, $\Delta n \cdot d/\lambda$ is larger than zero but smaller than two and a twist angle $\beta$ within 15 degrees of 0° or within 5 degrees of 60°, or, for direct mode, a twist angle $\beta$ is within 15 degrees of 0° or within 15 degrees of 90°.

35. The electro-optical display device of claim 6, 8, 12, 24 or 25 wherein $\alpha_o>0°$.

36. The electro-optical display device of claim 2, 6, 8, 12 or 21, wherein the axes of twisting of said liquid crystal molecules are substantially perpendicular to the plane of said substrate.

37. The electro-optical display device of claim 2, 6, 8, 12 or 22, which comprises a pair of electrodes comprising strip or line-type electrodes which extend to make a space between said pair of electrodes.

38. The electro-optical display device of claim 37 wherein said space between said pair of electrodes in 2 µm to 50 µm.

39. The electro-optical display device of claim 37 wherein the applied voltage between said pair of electrodes in case of maximum contrast is one volt to 80 volts.

40. The electro-optical display device of claim 2, 6, 8, 12 or 22, wherein the thickness of said liquid crystal layer is 1 µm to 10 µm.

41. The electro-optical display device of claim 2, 6, 8, 12 or 22, which comprises switching elements having image spots wherein the area of each image spot is 10 µm² to 1 mm².

42. The electro-optical display device according to claim 2, 6, 8, 12, or 22 wherein said switching elements further comprise a birefringent optical compensator.

43. The electro-optical display device according to claim 42, wherein said switching elements further comprise a birefringent optical compensator in optical relation to the liquid crystal layer and said polarizer.

44. The electro-optical display device according to claim 2, 6, 8, 12 or 22, wherein said liquid crystal layer contains a dichroic dye.

45. The electro-optical display device according to claim 2, 6, 8, 12 or 22, wherein the liquid crystal layer thereof comprises a liquid crystal polymer.

46. The electro-optical display device of claim 2, 6, 8, 12, or 12, further comprising an active matrix for controlling the liquid crystal switching elements thereof.

47. The electro-optical display device of claim 46, wherein the matrix is a transistor matrix, the transistors being located between the substrate and said liquid crystal layer of said switching elements.

48. The electrooptical display device of claim 2, wherein said liquid crystal molecules have a pretilt angle $\alpha_0$, wherein $0°<\alpha_0<30°$.

49. An electro-optical display device comprising a plurality of liquid crystal switching elements which comprise:

(a) a liquid crystal layer comprising liquid crystal molecules;

(b) a substrate;

(c) a polarizer in optical relation with said liquid crystal layer;

(d) an electrode structure, formed between said substrate and said liquid crystal layer, having a pair of electrodes with a space therebetween for generating an electric field having a component predominantly in parallel with said substrate;

(e) an orientation layer, formed between said substrate and said liquid crystal layer, having a surface that gives said liquid crystal molecules an orientation angle $\beta_0$, whereby said display device has an image contrast which is less dependent on viewing angle than identical display devices which have $\beta_0=0°$ and $\beta_0=90°$.

50. The electro-optical display device of claim 49 wherein said liquid crystal switching elements further comprise a reflector and a driver for controlling said liquid crystal switching elements wherein said polarizer is a polarizer/analyzer, said polarizer/analyzer and said reflector sandwich said liquid crystal layer, and wherein pretilt angle $\alpha_o$ and said orientation angle $\beta_o$ are such that $0°<\beta_o<90°$, and $0°\leq\alpha_o<30°$.

51. The electro-optical display device of claim 50, wherein $0°\leq\alpha_o\leq5°$.

52. The electro-optical display device of claim 50, wherein said liquid crystal molecules are nematic.

53. The electro-optical display device of claim 50, wherein said electric field changes the twisting degree of said liquid crystal molecules continuously or stepwise to provide different degrees of light transmission by said liquid crystal switching elements in the range between substantially maximum and minimum light transmission of said electro-optical display device.

54. An electro-optical display device comprising a plurality of liquid crystal switching elements which comprise:

(a) a liquid crystal layer comprising liquid crystal molecules:

(b) a substrate;

(c) a polarizer in optical relation with said liquid crystal layer;

(d) an electrode structure, formed between said substrate and said liquid crystal layer, having a pair of electrodes with a space therebetween for generating an electric field having a component predominantly in parallel with said substrate;

(e) an orientation layer, formed between said substrate and said liquid crystal layer, having a surface that gives said liquid crystal molecules an orientation angle $\beta_o$ and a pretilt angle $\alpha_o$, wherein $0°\leq\alpha_o<30°$, whereby said display device has an image contrast which is less dependent on viewing angle than identical display devices which have $\beta_0=0°$ and $\beta_0=90°$, respectively.

55. The electro-optical display device of claim 54 comprising a plurality of image spots formed by said liquid crystal switching elements, which further comprise
a driver for controlling said liquid crystal switching elements and a reflector, wherein said polarizer is a polarizer/analyzer, said polarizer/analyzer and said reflector sandwich said liquid crystal layer, and wherein a pretilt angle $\alpha_o$ and said orientation angle $\beta_o$ sufficient to prevent domain formation in the portions of said liquid crystal layer which form said image spots.

56. The electro-optical display device of claim 54 comprising a plurality of image spots formed by said liquid crystal switching elements, which further comprise
a driver for controlling said liquid crystal switching elements and a reflector wherein said polarizer is a polarizer/analyzer, said polarizer/analyzer and said reflector sandwich said liquid crystal layer, and wherein said pretilt angle $\alpha_o$ and said orientation angle $\beta_o$ are sufficient to suppress domain formation in the portions of said liquid crystal layer which form said image spots.

57. In an electro-optical display device comprising a layer of liquid crystal molecules having a surface which provides an image which is switched under control of an electric field predominantly parallel to said surface, the improvement wherein said molecules have an orientation angle $\beta_0$ which is larger than zero degrees but not larger than 20 degrees in the case of negative dielectric anisotropy or an orientation angle $\beta_0$ which is not smaller than 70 degrees but less than 90 degrees in the case of positive dielectric anisotropy.

58. The electro-optical display device of claim 57, wherein said molecules have a pretilt angle $\alpha_o$, wherein $0°\leq\alpha_o<30°$.

59. The electro-optical display device of claim 57, wherein said molecules have a pretilt angle $\alpha_o$, wherein $0° \leq \alpha_o \leq 20°$.

60. The electro-optical display device of claim 57, wherein said molecules have a pretilt angle $\alpha_o$, wherein $0° \leq \alpha_o \leq 5°$.

61. The electro-optical display device according to claim 57, wherein said molecules have a pretilt angle $\alpha_0$ wherein $0° \leq \alpha_o \leq 1°$.

62. In an electro-optical display device comprising a layer of liquid crystal molecules having a surface which provides an image which is switched under control of an electric field predominantly parallel to said surface, the improvement wherein said molecules have an orientation angle $\beta_o$ whereby said display device has an image contrast which is less dependent on viewing angle than identical display devices which have $\beta_0=0°$ and $\beta_0=90°$, respectively.

63. The electro-optical display device of claim 57 or 62 comprising a plurality of liquid crystal switching elements which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules an orientation angle $\beta_o$, wherein $0°<\beta_o<90°$, and a pretilt angle $\alpha_o$, wherein $0° \leq \alpha \leq 30°$; and (f) a voltage source connected to said electrode structure.

64. The electro-optical display device of claim 57 or 62 comprising a plurality of image spots formed by liquid crystal switching elements, which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules an orientation angle $\beta_o$ sufficient to prevent domain formation in the portions of said liquid crystal layer which form said image spots; and (f) a voltage source connected to said electrode structure.

65. The electro-optical display device of claim 57 or 62 comprising a plurality of image spots formed by liquid crystal switching elements, which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules a pretilt angle $\alpha_o$ and an orientation angle $\beta_o$ sufficient to prevent domain formation in the portions of said liquid crystal layer which form said image spots; and (f) a voltage source connected to said electrode structure.

66. The electro-optical display device of claim 65, wherein the pretilt angle $\alpha_0$ is larger than zero degrees but smaller than 30 degrees.

67. The electro-optical display device of claim 57 or 62 comprising a plurality of liquid crystal switching elements which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules an orientation angle $\beta_o$, wherein $0°<\beta_o<90°$;

(f) a voltage source connected to said electrode structure; and (g) a transistor matrix for controlling said liquid crystal switching elements, the transistors being located between said substrate and said liquid crystal layer of said switching elements.

68. The electro-optical display device of claim 67 wherein said liquid crystal molecules are nematic and said electric field component predominantly in parallel with said substrate surface is for continuously or stepwise changing the twisting degree of said liquid crystal molecules.

69. The electro-optical display device of claim 67, wherein said pair of electrodes are arranged alternately in different planes in parallel with said substrate.

70. The electro-optical display device of claim 67, wherein an axis of twist of said liquid crystal molecules is substantially perpendicular to the plane of said substrate.

71. The electro-optical display device of claim 67, wherein said pair of electrodes comprise strip or line-type electrodes which extend to make said space therebetween.

72. The electro-optical display device of claim 67, wherein the thickness of said liquid crystal layer is 1 µm to 10 µm.

73. The electro-optical display device of claim 67, wherein said switching elements have image spots and the area of each of said image spots is 10 µm$^2$ to 1 mm$^2$.

74. The electro-optical display device of claim 67, wherein said space between said pair of electrodes in 2 µm to 50 µm.

75. The electro-optical display device of claim 67, wherein an applied voltage between said pair of electrodes in a case of maximum contrast is one volt to 80 volts.

76. The electro-optical display device according to claim 67, wherein said switching elements further comprise a birefringent optical compensator between said liquid crystal layer and said polarizer or an analyzer.

77. The electro-optical display device according to claim 67, wherein said liquid crystal layer contains a dichroic dye.

78. The electro-optical display device according to claim 67, wherein said liquid crystal layer comprises a liquid crystal polymer.

79. The electro-optical display device of claim 57 or 62 comprising a plurality of liquid crystal switching elements, which comprise:
   (a) said liquid crystal layer comprising said liquid crystal molecules;
   (b) a substrate parallel to said surface of said layer;
   (c) a polarizer and an analyzer sandwiching said liquid crystal layer;
   (d) an electrode structure, formed between said substrate and said liquid crystal layer, having at least a pair of electrodes with a space therebetween for generating said electric field having a component predominantly in parallel with said surface and said substrate;
   (e) an orientation layer, formed between said substrate and said liquid crystal layer, having a surface that gives said liquid crystal molecules a pretilt angle $\alpha_o$ larger than zero degrees but smaller than 30 degrees and an orientation angle $\beta_o$, wherein $0°<\beta_o<90°$; and
   (f) a transistor matrix for controlling said liquid crystal switching elements, the transistors being located between said substrate and said liquid crystal layer of said switching elements.

80. The electro-optical display device of claim 79 wherein said molecules have a pretilt angle $\alpha_0$ wherein $0°\leq\alpha_0\leq5°$.

81. The electro-optical display device according to claim 79, wherein the angle between the orientation direction of said liquid crystal molecules at the surface of said liquid crystal layer on the side of said polarizer and the transmitting direction of said polarizer is approximately zero degrees, and the angle between the transmitting direction of said polarizer and said analyzer is approximately zero degrees or approximately 90 degrees.

82. The electro-optical display device according to claim 79, wherein the angle between the orientation direction of said liquid crystal molecules at a surface of said liquid crystal layer on the side of said polarizer and the transmitting direction of said polarizer is approximately 90 degrees, and the angle between the transmitting direction of said polarizer and said analyzer is approximately zero degrees or approximately 90 degrees.

83. The electro-optical display device of claim 57, or 62 comprising a plurality of liquid crystal switching elements which comprise:
   (a) said liquid crystal layer comprising said liquid crystal molecules wherein the latter are twistable;
   (b) a substrate parallel to said surface of said layer;
   (c) a polarizer on one side of said liquid crystal layer and an analyzer on the other side of said liquid crystal layer;
   (d) an electrode structure, formed in each of said liquid crystal switching elements between said substrate and said liquid crystal layer, having at least a pair of electrodes with a space therebetween for generating said electric field having a component predominantly in parallel with said surface and said substrate, wherein said electric field is for continuously or stepwise changing the twisting degree of said liquid crystal molecules to correspondingly change the degree of light transmission of said liquid crystal switching elements in the range between substantially maximum and minimum light transmission of said electro-optical display device;
   (e) an orientation layer, formed between said substrate and said liquid crystal layer having a surface that gives said liquid crystal molecules an orientation angle $\beta_o$ wherein $0°<\beta_o<90°$ and a pretilt angle $\alpha_o$ larger than zero degrees but smaller than 30 degrees; and
   (f) a transistor matrix for controlling said liquid crystal switching elements, the transistors being located between said substrate and said liquid crystal layer of said switching elements.

84. The electro-optical display device of claim 57 or 62 comprising a plurality of image spots formed by liquid crystal switching elements, which comprise:
   (a) said liquid crystal layer comprising said liquid crystal molecules wherein the latter are twistable;
   (b) a substrate parallel to said surface of said layer;
   (c) a polarizer and an analyzer sandwiching said liquid crystal layer;
   (d) an electrode structure, formed between said substrate and said liquid crystal layer, having at least a pair of electrodes with a space therebetween for generating said electric field having a component predominantly in parallel with said surface and said substrate for changing continuously or stepwise the twisting degree of said liquid crystal molecules;
   (e) an orientation layer, formed between said electrode structure and said liquid crystal layer having a surface that gives said liquid crystal molecules a pretilt angle $\alpha_o$ and an orientation angle $\beta_o$ sufficient to prevent domain formation in the portions of said liquid crystal layer which form said image spots; and
   (f) a transistor matrix for controlling said liquid crystal switching elements, the transistors being located between said substrate and said liquid crystal layer of said switching elements.

85. The electro-optical display device of claim 57 or 62 comprising a plurality of liquid crystal switching elements which comprise:
   (a) said liquid crystal layer comprising said liquid crystal molecules wherein the latter are twistable and wherein $\Delta n \bullet d/\lambda$ of said liquid crystal layer is larger than zero but smaller than four, and a twist angle $\beta$ of said liquid crystal layer is within 15 degrees of 0° or within 15 degrees of 90°;
   (b) a substrate parallel to said surface of said layer:
   (c) a polarizer and an analyzer sandwiching said liquid crystal layer;
   (d) an electrode structure, all of which is formed between said substrate and said liquid crystal layer, having a pair of electrodes with a space therebetween for generating said electric field having a component predominantly in parallel with said surface and said substrate for changing the twisting degree of said liquid crystal molecules;
   (e) an orientation layer formed between said substrate and said liquid crystal layer, having a surface that gives said liquid crystal molecules a pretilt angle $\alpha_0$ which is larger than zero degrees but smaller than 30 degrees and an orientation angle $\beta_0$ larger than zero but smaller than 90 degrees: and
   (f) a transistor matrix for controlling said liquid crystal switching elements, the transistors being located between said substrate and said liquid crystal layer of said switching elements.

86. The electro-optical display device of claim 57 or 62 comprising a plurality of liquid crystal switching elements which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules a pretilt angle $\alpha_o$ which is about zero degrees; and (f) a driver for controlling said liquid crystal switching elements.

87. The electro-optical display device of claim 86, wherein said liquid crystal molecules are nematic.

88. The electro-optical display device of claim 86, wherein said electric field changes the twisting degree of said liquid crystal molecules continuously or stepwise to provide different degrees of light transmission by said liquid crystal switching elements in the range between substantially maximum and minimum light transmission of said electro-optical display device.

89. The electro-optical display device according to claim 86, wherein said driver is a transistor matrix.

90. The electro-optical display device according to claim 86, wherein saiddriver operates in accordance with the time multiplex method.

91. The electro-optical display device of claim 86, wherein said pair of electrodes are arranged alternately in different planes in parallel with said substrate.

92. The electro-optical display device of claim 86, wherein the axes of twist of said liquid crystal molecules are substantially perpendicular to the plane of said substrate.

93. The electro-optical display device according to claim 86, wherein the angle between the orientation direction of said liquid crystal molecules at a surface of said liquid crystal layer on the side of said polarizer and the transmitting direction of said polarizer is approximately zero degrees, and the angle between the transmitting directions of said polarizer and said analyzer is approximately zero degrees or approximately 90 degrees.

94. The electro-optical display device according to claim 86, wherein the angle between the orientation direction of said liquid crystal molecules at a surface of said liquid crystal layer on the side of said polarizer and the transmitting direction of said polarizer is approximately 90 degrees, and the angle between the transmitting directions of said polarizer and said analyzer is approximately zero degrees or approximately 90 degrees.

95. The electro-optical display device of claim 57 or 62 comprising a plurality of liquid crystal switching elements, which comprise:

(a) said liquid crystal layer comprising said liquid crystal molecules;

(b) a substrate parallel to said surface of said layer;

(c) a polarizer and an analyzer sandwiching said liquid crystal layer;

(d) an electrode structure, formed between said substrate and said liquid crystal layer, having at least a pair of electrodes with a space therebetween for generating said electric field having a component predominantly in parallel with said surface and said substrate;

(e) an orientation layer, formed between said substrate and said liquid crystal layer, having a surface that gives said liquid crystal molecules a pretilt angle $\alpha_o$ larger than zero degrees but smaller than 30 degrees and an orientation angle $\beta_o$, wherein $0°<\beta_o<90°$; and (f) an active matrix for controlling said liquid crystal switching elements.

96. The electro-optical display device of claim 57 or 62 comprising a plurality of image spots formed by liquid crystal switching elements, which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules an orientation angle $\beta_o$ sufficient to suppress domain formation in the portions of said liquid crystal layer which form said image spots; and (f) a voltage source connected to said electrode structure.

97. The electro-optical display device of claim 57 or 62 comprising a plurality of image spots formed by liquid crystal switching elements, which comprise:

(a) said liquid crystal layer comprising said liquid crystal molecules;

(b) a substrate parallel to said surface of said layer;

(c) a polarizer in optical relation with said liquid crystal layer;

(d) an electrode structure, formed between said substrate and said liquid crystal layer, having a pair of electrodes with a space therebetween for generating said electric field having a component predominantly in parallel with said surface and said substrate;

(e) an orientation layer, formed between said substrate and said liquid crystal layer, having a surface that gives said liquid crystal molecules a pretilt angle $\alpha_o$ and an orientation angle $\beta_o$ sufficient to suppress domain formation in the portions of said liquid crystal layer which form said image spots; and (f) a voltage source connected to said electrode structure.

98. The electro-optical display device of claim 97 wherein the pretilt angle is larger than zero degree but smaller than 30 degrees.

99. The electro-optical display device of claim 57 or 62 comprising a plurality of image spots formed by liquid crystal switching elements, which comprise:

(a) said liquid crystal layer comprising said liquid crystal molecules wherein the latter are twistable;

(b) a substrate parallel to said surface of said layer;

(c) a polarizer and an analyzer sandwiching said liquid crystal layer;

(d) an electrode structure, formed between said substrate and said liquid crystal layer, having at least a pair of electrodes with a space therebetween for generating said electric field having a component predominantly in parallel with said surface and said substrate for changing continuously or stepwise the twisting degree of said liquid crystal molecules;

(e) an orientation layer, formed between said electrode structure and said liquid crystal layer having a surface that gives said liquid crystal molecules a pretilt angle $\alpha_0$ and said orientation angle $\beta_0$ sufficient to suppress domain formation in the portions of said liquid crystal layer which form said image spots; and (f) a transistor matrix for controlling said liquid crystal switching elements, the transistors being located between said substrate and said liquid crystal layer of said switching elements.

100. An electro-optical display device comprising a plurality of liquid crystal switching elements which comprise:

(a) a liquid crystal layer comprising liquid crystal molecules;

(b) a substrate;

(c) a polarizer and an analyzer sandwiching said liquid crystal layer;

(d) an electrode structure all of which is formed between said substrate and said liquid crystal layer having a pair of electrodes with a space therebetween for generating an electric field having a component predominantly in parallel with the surface of said substrate;

(e) an orientation layer formed between said substrate and said liquid crystal layer having a surface that gives said liquid crystal molecules a pretilt angle $\alpha_0$ larger than zero degrees but smaller than 30 degrees and an orientation angle $\beta_0$ larger than zero degree but not larger than 20 degrees in case of negative dielectric anisotropy or not smaller than 70 degrees but less than 90 degrees in case of positive dielectric anisotropy; and (f) a transistor matrix for controlling said liquid crystal switching elements, the transistors being located between said substrate and said liquid crystal layer of said switching elements.

101. The electro-optical display device according to claim 100 wherein $\Delta n \bullet d/\lambda$ of said liquid crystal layer is larger than zero but smaller than four.

102. The electro-optical display device according to claim 100, wherein a twist angle $\beta$ of said liquid crystal layer is within 15 degrees of 0° or within 15 degrees of 90°.

103. An electro-optical display device comprising a plurality of liquid crystal switching elements which comprise:

(a) a liquid crystal layer comprising twistable liquid crystal molecules having positive dielectric anisotropy and wherein $\Delta n \bullet d/\lambda$ of said liquid crystal layer is larger than zero but smaller than four and a twist angle $\beta$ of said liquid crystal layer is within 15 degrees of 0° or within 15 degrees of 90°;

(b) a substrate;

(c) a polarizer and an analyzer sandwiching said liquid crystal layer;

(d) an electrode structure, all of which is formed between said substrate and said liquid crystal layer, having a pair of electrodes with a space therebetween for generating an electric field having a component predominantly in parallel with said substrate;

(e) an orientation layer, formed between said electrode structure and said liquid crystal layer, having a surface that gives said liquid crystal molecules a pretilt angle $\alpha_0$ larger than zero degrees but smaller than 30 degrees and an orientation angle $\beta_0$ not smaller than 70 degrees but less than 90 degrees; and (f) a transistor matrix for controlling said liquid crystal switching elements, the transistors being located between said substrate and said liquid crystal layer of said switching elements.

104. An electro-optical display device comprising a plurality of liquid crystal switching elements which comprise:

(a) a liquid crystal layer comprising twistable liquid crystal molecules having negative dielectric anisotropy and wherein $\Delta n \bullet d/\lambda$ of said liquid crystal layer is larger than zero but smaller than four and a twist angle $\beta$ of said liquid crystal layer is within 15 degrees of 0° or within 15 degrees of 90°;

(b) a substrate;

(c) a polarizer and an analyzer sandwiching said liquid crystal layer;

(d) an electrode structure all of which is formed between said substrate and said liquid crystal layer having a pair of electrodes with a space therebetween for generating an electric field having a component predominantly in parallel with the surface of said substrate:

(e) an orientation layer formed between said electrode structure and said liquid crystal layer having a surface that gives said liquid crystal molecules a pretilt angle $\alpha_0$ larger than zero degrees but smaller than 30 degrees and an orientation angle $\beta_0$ larger than zero degree but not larger than 20 degrees; and (f) a transistor matrix for controlling said liquid crystal switching elements, the transistors being located between said substrate and said liquid crystal layer of said switching elements.

105. An electro-optical display device comprising a plurality of liquid crystal switching elements which comprise:

(a) a liquid crystal layer comprising liquid crystal molecules;

(b) a substrate:

(c) a polarizer and an analyzer sandwiching said liquid crystal layer;

(d) an electrode structure, all of which is formed between said substrate and said liquid crystal layer, having a pair of electrodes with a space therebetween for generating an electric field having a component predominantly in parallel with the surface of said substrate;

(e) an orientation layer formed between said substrate and said liquid crystal layer having a surface that gives said liquid crystal molecules a pretilt angle $\alpha_0$ larger than zero degrees but smaller than 30 degrees and an orientation angle $\beta_0$ larger than zero degrees but not larger than 20 degrees in case of negative dielectric anisotropy or not smaller than 70 degrees but less than 90 degrees in case of positive dielectric anisotropy; and (f) a direct triggering device for triggering of said switching elements, or a transistor matrix for controlling said liquid crystal switching elements, the transistors being located between said substrate and said liquid crystal layer of said switching elements.

106. An electro-optical display device comprising a plurality of liquid crystal switching elements which comprise:

(a) a liquid crystal layer comprising liquid crystal molecules;

(b) a substrate;

(c) a polarizer, an analyzer and a reflector sandwiching said liquid crystal layer;

(d) an electrode structure formed between said substrate and said liquid crystal layer having a pair of electrodes with a space therebetween for generating an electric field having a component predominantly in parallel with a surface of said substrate;

(e) an orientation layer formed between said substrate and said liquid crystal layer having a surface that gives said liquid crystal molecules a pretilt angle $\alpha_0$ larger than zero degrees but smaller than 30 degrees and an orientation angle $\beta_0$ larger than zero degrees but not larger than 20 degrees in case of negative dielectric anisotropy or not smaller than 70 degrees but less than 90 degrees in case of positive dielectric anisotropy: and (f) a driver for controlling said liquid crystal switching elements.

107. The electro-optical display device according to claim 106, wherein $\Delta n \bullet d/\lambda$ of said liquid crystal layer is larger than zero but smaller than two and a twist angle $\beta$ of said liquid crystal layer is within 15 degrees of 0° or within 5 degrees of 60° and the liquid crystal molecules have positive dielectric anisotropy.

108. The electro-optical display device according to claim 106, wherein $\Delta n \bullet d/\lambda$ of said liquid crystal layer is larger than zero but smaller than two, and a twist angle $\beta$ of said liquid crystal layer is within 15 degrees of 0° or within 5 degrees of 60° and the liquid crystal molecules have negative dielectric anisotropy.

109. The electro-optical display device of claim 106, wherein said pair of electrodes are arranged alternately in different planes in parallel with said substrate.

110. The electro-optical display device of claim 106 wherein an axis of twist of said liquid crystal molecules is substantially perpendicular to the plane of said substrate.

111. The electro-optical display device of claim 106, wherein said pair of electrodes comprise strip or line-type electrodes which extend to make said space therebetween.

112. The electro-optical display device of claim 106, wherein the thickness of said liquid crystal layer is 1 μm to 10 μm.

113. The electro-optical display device of claim 106, wherein said space between said pair of electrodes in 2 μm to 50 μm.

114. The electro-optical display device of claim 106, wherein an applied voltage between said pair of electrodes in a case of maximum contrast is one volt to 80 volts.

115. The electro-optical display device according to claim 106, wherein $\Delta n \bullet d/\lambda$ of said liquid crystal layer is larger than zero but smaller than two.

116. The electro-optical display device according to claim 106 wherein a twist angle $\beta$ of said liquid crystal layer is within 15 degrees of 0° or within 5 degrees of 60°.

117. The electro-optical display device according to claim 106, wherein the angle between the orientation direction of said liquid crystal molecules at surface of said liquid crystal layer on the side of said polarizer and the transmitting direction of said polarizer is approximately zero degrees, and the angle between the transmitting directions of said polarizer and said analyzer is approximately zero degrees of approximately 90 degrees.

118. The electro-optical display device according to claim 106, wherein the angle between the orientation direction of said liquid crystal molecules at a surface of said liquid crystal layer on the side of said polarizer and the transmitting direction of said polarizer is approximately 90 degrees, and the angle between the transmitting directions of said polarizer and said analyzer is approximately zero degrees of approximately 90 degrees.

119. The electro-optical display device according to claim 106 wherein said reflector is a dielectric mirror.

120. An electro-optical display device comprising a plurality of liquid crystal switching elements which comprise:

(a) a liquid crystal layer comprising liquid crystal molecules:

(b) a substrate:

(c) a polarizer and an analyzer sandwiching said liquid crystal layer; (d) an electrode structure is formed between said substrate and said liquid crystal layer having a pair of electrodes with a space therebetween for generating an electric field having a component predominantly in parallel with the surface of said substrate:

(e) an orientation layer formed between said substrate and said liquid crystal layer having a surface that gives said liquid crystal molecules a pretilt angle $\alpha_0$ larger than zero degrees but smaller than 30 degrees and an orientation angle $\beta_0$ larger than zero degrees but not larger than 20 degrees in case of negative dielectric anisotropy or not smaller than 70 degrees but less than 90 degrees in case of positive dielectric anisotropy; and (f) an active matrix for controlling said liquid crystal switching elements.

121. An electro-optical liquid crystal switching element which comprises:

(a) a liquid crystal layer, comprising liquid crystal molecules and having a surface suitable for display of an image; and (b) an electrode structure for generating an electric field having a component predominantly in parallel with said surface:

wherein said liquid crystal molecules have an orientation angle $\beta_o$ which is larger than zero degrees but not larger than 20 degrees in the case of negative dielectric anisotropy or an orientation angle $\beta_o$ which is not smaller than 70 degrees but less than 90 degrees in the case of positive dielectric anisotropy.

122. The electro-optical switching element of claim further comprising:

(c) a substrate;

(d) a polarizer in optical relation with said liquid crystal layer; and (e) a voltage source connected to said electrode structure.

123. The electro-optical switching element of claim 122, wherein said electrode structure is formed between said substrate and said liquid crystal layer and comprises at least a pair of electrodes having a space therebetween.

124. The electro-optical switching element of claim 123 further comprising:

(f) an orientation layer formed between said electrode structure and said liquid crystal layer, having a surface which aligns said liquid crystal molecules in a direction whereby said liquid-crystal molecules have said orientation angle $\beta_o$.

125. The electro-optical switching element of claim 124 wherein said liquid crystal molecules have a pretilt angle $\alpha_o$, wherein $0° \leq \alpha_o \leq 30°$.

126. The electro-optical switching element of claim 125, wherein $0° \leq \alpha_o \leq 20°$.

127. The electro-optical switching element of claim 126, wherein $0° \leq \alpha_o \leq 5°$.

\* \* \* \* \*

UNITED STATES PATENT AND TRADEMARK OFFICE
CERTIFICATE OF CORRECTION

PATENT NO.    : 5,576,867
DATED         : November 19, 1996
INVENTOR(S)   : Gunter Baur et al.

It is certified that error appears in the above-identified patent and that said Letters Patent is hereby corrected as shown below:

Drawings,
Figures 2a and 2b on item labeled "16", "$\psi$" should be -- $\psi'$ --.

Column 3,
Line 30, change "between 020 and" to -- between 0 and --.

Column 4,
Line 66, change "$\equiv/\equiv\varepsilon$" to -- $\Delta\varepsilon$ --.

Column 10,
Line 8, in Table 1, change "$\Delta_\varepsilon$" to -- $\Delta\varepsilon$ --.

Column 11,
Line 16, change "$dx\Delta n/\pi$" to -- $dx\Delta n/\lambda$ --.

Column 11 and 12,
Table 3, change the value "$\leq 0°, <20°$" in the line for R4 and the column for $\beta_o$ to -- $>0°, \leq 20°$ --.

Column 12
Line 28, change "$dx\Delta n/\eta$" to -- $dx\Delta n/\lambda$ --.

Column 13,
Line 29, change "claim 6" to -- claim 6, --.
Line 35, change "$\Delta n \bullet d/\lambda$" to -- $d \bullet \Delta n/\lambda$ --.
Line 41, change "$\Delta n \bullet d/\lambda$" to -- $d \bullet \Delta n/\lambda$ --.
Line 49, change "claim 1" to -- claim 6 --.
Line 63, change "8" to -- 6 --.
Line 67, change "$0° \leq \alpha_o \leq 30°$" to -- $0° < \alpha_o < 30°$ --.

Column 14,
Line 55, change "said liquid crystal" to -- said liquid crystal layer --.
Lines 57 and 63, change "$\Delta n \bullet d/\lambda$" to -- $d \bullet \Delta n/\lambda$ --.
Line 64, change "$\beta$" to -- $\beta$ is --.

Column 15,
Lines 11 and 13, change "claim 37" to -- claim 37, --.
Line 12, change "electrodes in" to -- electrodes is --.
Line 23, change "or 22" to -- or 22, --.
Line 36, change "or 12" to -- or 22 --.

UNITED STATES PATENT AND TRADEMARK OFFICE
CERTIFICATE OF CORRECTION

PATENT NO.   : 5,576,867
DATED        : November 19, 1996
INVENTOR(S)  : Gunter Baur et al.

It is certified that error appears in the above-identified patent and that said Letters Patent is hereby corrected as shown below:

Column 16,
Line 2, change "pretilt" to -- a pretilt --.
Line 43, change "$\beta_o$" to -- $\beta_o$ are --.
Line 50, change "reflector" to -- reflector, --.

Column 19,
Line 49, change "57, or" to -- 57 or --.

Column 20,
Line 44, change "$\Delta n \bullet d/\lambda$" to -- $d \bullet \Delta n/\lambda$ --.

Column 21,
Line 33, change "saiddriver" to -- said driver --.

Column 22,
Line 54, change "angle" to -- angle $\alpha_o$ --.

Column 23,
Lines 40 and 49, change "$\Delta n \bullet d/\lambda$" to -- $d \bullet \Delta n/\lambda$ --.

Column 24,
Line 9, "$\Delta n \bullet d/\lambda$" to -- $d \bullet \Delta n/\lambda$ --.
Line 26, change "degree" to -- degrees --.

Column 25,
Lines 16, 21 and 45, change "$\Delta n \bullet d/\lambda$" to -- $d \bullet \Delta n/\lambda$ --.
Line 53, change "at surface" to -- at a surface --.
Lines 56 and 65, change "degrees of" to -- degrees or --.

UNITED STATES PATENT AND TRADEMARK OFFICE
CERTIFICATE OF CORRECTION

PATENT NO. : 5,576,867
DATED : November 19, 1996
INVENTOR(S) : Gunter Baur et al.

It is certified that error appears in the above-identified patent and that said Letters Patent is hereby corrected as shown below:

<u>Column 26,</u>
Line 40, change "claim" to -- claim 121 --.
Line 60, change "$0° \leq \alpha_o \leq 30°$" to -- $0° \leq \alpha_o < 30°$ --.

Signed and Sealed this

Twentieth Day of December, 2005

JON W. DUDAS
*Director of the United States Patent and Trademark Office*